US006768500B1

(12) United States Patent
Emrani

(10) Patent No.: US 6,768,500 B1
(45) Date of Patent: *Jul. 27, 2004

(54) METHOD AND APPARATUS FOR CONVERTING IMAGE FILES INTO HIERARCHICAL CHARTS AS A LEARNING AID

(75) Inventor: Ramin Emrani, Brentwood, CA (US)

(73) Assignee: Edutainment, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,369

(22) Filed: Feb. 2, 2000

(51) Int. Cl.[7] .................................................. G06F 3/14
(52) U.S. Cl. ........................ 345/730; 345/764; 345/762; 345/765; 345/853
(58) Field of Search ................................ 345/764, 853, 345/762, 765, 839, 730, 731; 707/514, 515, 529, 526

(56) References Cited

U.S. PATENT DOCUMENTS 5,464,327 A * 11/1995 Horwitz ........................ 417/12
5,841,900 A * 11/1998 Rahgozar et al. ........... 382/176

* cited by examiner

Primary Examiner—Kristine Kincaid
Assistant Examiner—Thomas T. Nguyen
(74) Attorney, Agent, or Firm—Blakely, Sokoloff, Taylor & Zafman

(57) ABSTRACT

A method for converting a document which contains words and images which is intended to convey information in a traditional, linear format into a document or display in which the words and images are rearranged so that the result is laid out in a pictorial representation which makes it much easier for a person using the document to understand its content. To create the easier to understand pictorial/graphical representation, a document, in its original format, is stored so that it can be accessed by a user using a personal computer or work station. A user accesses the document in its original format, selects portions of the document, and each selected portion is assigned a category for subsequent processing. The categories which may be assigned are selected from among the following: i) structural, ii) functional, iii) procedural, iv) time based, and v) event based. Additional categories may be added as a function of the desired end result and specific sub-parts or diagrams. Once the categories have been assigned to selected portions of the document, a new document is created which displays the information in the original document in a much easier to understand pictorial/graphical representation.

5 Claims, 62 Drawing Sheets

(60 of 62 Drawing Sheet(s) Filed in Color)

METHOD AND APPARATUS FOR CONVERTING IMAGE FILES INTO HIERARCHICAL CHARTS AS A LEARNING AID

BACKGROUND OF THE INVENTION

1. Field of the Invention

The invention is a methodology for enabling the visualization, acquisition, understanding, utilization, creation and sharing of information using document structures and visual or pictorial representation of documents.

2. Description of the Prior Art

Numerous teachings exist for displaying document information in a visual or pictorial manner. See, for example, U.S. Pat. No. 4,613,946 Method and Apparatus for Generating Hierarchical Displays, U.S. Pat. No. 4,764,867 Display System and Method for Constructing and Editing a Hierarchical Arrangement of Information and U.S. Pat. No. 5,644,740 Method and Apparatus for Displaying Items of Information Organized in a Hierarchical Structure. However, the prior art does not provide a mechanism for quickly and easily assigning categories to selected portions of document information and using the assigned categories to produce a pictorial representation of the information appropriate to the assigned category in an intuitive and easy to understand manner.

SUMMARY OF THE INVENTION

A method and apparatus are described for converting a document which contains words and images which is intended to convey information in a traditional, linear format into a document or display in which the words and images are rearranged so that the result is laid out in a pictorial representation which makes it much easier for a person using the document to understand its content. To create the easier to understand pictorial/graphical representation, a document, in its original format, is stored so that it can be accessed by a user using a personal computer or work station including a monitor, storage, keyboard and pointing device. The document in its original format may be created by a word processor or the like. Using an interface which forms part of the present invention, a user having a computer or workstation accesses the document in its original format from the storage such that it is displayed on the monitor. The user scrolls through the document and selects portions of the document, and each selected portion is assigned a category for subsequent processing. The categories which may be assigned are selected from among the following: i) structural, ii) functional, iii) procedural, iv) time based, and v) event based. Additional categories may be added as a function of the desired end result and specific sub-parts or diagrams. The user selects which of the five categories to assign based on the subject matter of the text and images. For example, if the subject matter is a description of the parts of an automobile engine and how the parts connect to each other, the structural category would be assigned. If the subject matter is a description of how the engine operates, the functional category would be assigned. If the subject matter is a description of how to build the engine, the procedural category would be assigned. If the subject matter is a description of the history of facts leading to the development of the engine, the time based and/or event based category would be assigned, depending on what one wishes to communicate or emphasize. If specific dates are more important and is to be communicated, then the time based category would be assigned. If the specific events which occurred are more important than the time when they occurred, then the event based category would be assigned.

The invention provides an interface which makes the selection and assigning of categories process easy, intuitive and efficient. Once the categories have been assigned to selected portions of the document, a new document is created which displays the information in the original document in a much easier to understand pictorial/graphical representation. Specifically, portions of the text and images of the original document are selected, using for example, a mouse or other pointing device. The selected portions are then assigned a category selected from S T E P F, i.e., structural, time based, event based, procedural or functional. After all the desired text and images in the document has been assigned one of the S T E P or F categories, the selected portions are then sent to a corresponding software module for processing based on the assigned category. Since there are five categories, there are five modules. If additional categories are needed or desired, appropriate additional modules may be added. Selected images in the original document are sent to a sixth module for processing. After the processing of the text has been performed by one or more of the first five modules, and the processing of images, if any, has been performed by the sixth module, a seventh module is used to link the converted text and images together. If images are not present or desired, then no further processing needs to be performed by the sixth and/or seventh modules. Further processing, which is optional, may then be performed to create multiple hierarchies by an eighth module. A ninth module, which is also optional, may be used for editing layout, content and/or format. A tenth module, which is also optional, may be used to perform what is referred to knowledge level conversion.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 5b–5g show the results of the various processing steps performed by module 3a.

DETAILED DESCRIPTION OF THE INVENTION

Figure 1:
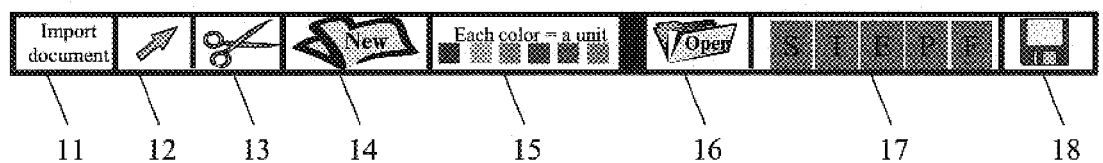
FIG. 1 shows the icons representing processing steps performed by pre-conversion module I.

A method and system are disclosed for converting a document which contains words and images which is intended to convey information in a traditional, linear format into a document or display in which the words and images are rearranged so that the result is laid out in form which makes it much easier for a person using the document to understand its content. The invention is implemented as a software system which includes a set of modules. The software system may be implemented to run on commercially available personal computer systems provided by a variety of vendors. Such personal computer systems typically include a processor, memory, including mass storage devices, keyboard and mouse or other pointing devices and a monitor or other display. In the preferred embodiment, there is a module for processing each one of five possible assigned categories. The specifics of the five possible categories is explained below, although there may be additional categories which may be assigned. There is a pre-conversion module I which is used to select text and images and assign one of the five categories to the selected portions. A pre-conversion module II is then used to separate the text from images in each assigned category. The text is then sent to one of a set of five modules corresponding to the five possible assigned categories, i.e., structural (S), time based (T), event based (E), procedural (P) and functional (F). Processing of the selected images, if any, is performed by a sixth module. Additional modules may then be used to link the text and images and to perform other optional processing as described in detail below.

Pre-conversion Module I:

Pre-conversion module I operates to:
1) select "units" of information to be conveyed and
2) save the "units" in one of five module databases (S, T, E, P, or F) for further processing.

A unit is defined to be an amount of information that covers a single, high level concept, but is not at such a high level as to require a large amount of text or images to convey. Typically, a unit would be 2–3 paragraphs of information or equivalent description if in any other form. Of course, in any particular case, a unit may be much smaller or much larger.

The processing performed by pre-conversion module I is described with reference to FIG. 1.

Begin
1) Click on icon 11 to import document (text and images.). The imported document is created using a word processing or equivalent program according to well known techniques.
2a) Select a distinct "unit" (example: ear or eye, ) using icon 12 and click on icon 13 to cut the selected unit carrying the images with it. When a unit is cut, then proceed to step 3 and the selected unit will be pasted into a new file.
2b) Optionally use icon 15, selecting from one of a number of distinct colors in the palette to color each selected unit to help visualize the number of units in a long document. Although six colors are shown in icon 15, by pressing a predetermined key (e.g., shift) on the keyboard of the workstation being used, an additional set of icons with different colors may be presented. Then, icon 13 is used to cut the first unit.
3) Click on icon 14 to create a new file for the unit. When a new file is created, the selected unit from 2a or 2b is pasted onto it.
4) Save the unit in the file by clicking on icon 18. If a document is long and there are, for example, 12 units, then there would be 12 saves.
5) Repeat steps 2–4 until desired portions of the document are broken down into individual units and saved.
6) After the entire document has been processed as described above, open the saved "unit" by clicking on icon 16.
7a) If the unit includes only one type of information, use icon 12 to select the entire document and then click on one of the elements in icon 17 to indicate the type of information, i.e., structural (S), time based (T), event based (E), procedural (P) or functional (F). Next, save each unit for subsequent processing by the appropriate software module S, T, E, P, or F by clicking on icon 18.
7b) If the unit includes two or more types of information, then it is necessary to select each portion of the document that corresponds to only one type of information. Next, cut and paste each sub-unit in its own file. For example, an ear document may contain all categories of information (S T E P or F). Each portion which is assigned a category, is referred to as a sub-unit. Each of the sub-units would then need to be cut and pasted into their own files and sent to the appropriate software module. It should be noted that these sub-units dealing with the same unit, in this case the ear, would be saved under a general folder "the ear" and each sub-unit will have a file name assigned to it. For example, anatomy of the ear file and physiology of the ear file belong to the folder "the ear". Then, save each sub-unit or unit for subsequent processing by the appropriate software module- S, T, E, P, or F by clicking on icon 18. From here on, sub-units or unit will be referred to as unit.

END

Of course, the specific icons and arrangements shown in FIG. 1 are not important. Further, creating the necessary code to perform each of the steps described above is well within the abilities of a person skilled in the relevant art. For example, a word processing programming which operates in a graphical user interface environment can perform the various selecting, cutting and saving operations.

Pre-conversion Module II:

Pre-conversion module II operates to:
1) separate text from images from among the units selected by pre-conversion module I.
2) save the "units" to open up later in one of the S T E P F modules or in the image editor module described below.

The processing performed by pre-conversion module II is described with reference to FIG. 2.

Begin
1) Click on icon 21 to open a "unit" saved in pre-conversion module I.
2) Click on icon 22 to create a new window adjacent to the document containing text and images.
3) Click on icon 23 to drag and drop the images from a text and image window to an image only window. This will leave one window with text and the other with images.
4) Click on icon 24 to save the new document. The contents of each window will be opened later by the appropriate software module (S T E P F or image editor) for further processing.

END

Figure 2:
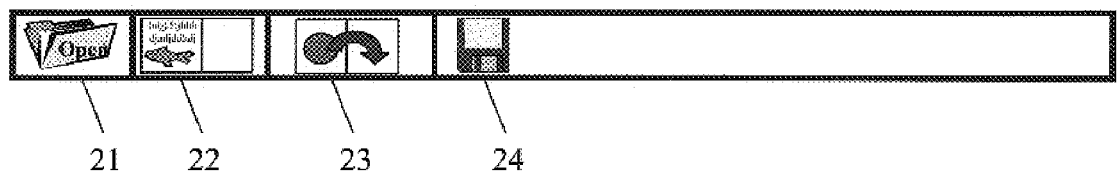
FIG. 2 shows the icons representing processing steps performed by pre-conversion module II.

Of course, the specific icons and arrangements shown in FIG. 2 are not important. Further, creating the necessary code to perform each of the steps described above is well within the abilities of a person skilled in the relevant art.

Module 1:

Module 1 operates to convert structural information into the invented pictorial/graphical format.

The processing performed by module 1 is described with reference to FIGS. 3, 3*a* and 3*b*.

Begin
1) Click on icon 31 to open the "structural unit". This causes the text portion of the unit to be available for further processing.
2) Tagging the heading: Locate the most general text which forms a heading and assign a color to it using icon 32. The choice of color is not important. Right clicking on the region containing icon 32 provides more colors. As used herein, selecting or locating text is performed using a mouse or other pointing device to select text or the like within a document according to well known techniques.
3) Tagging the sub-headings: Locate the text and assign colors to the fewest number of sub-headings possible by using icon 33 color palette. Right clicking on the region containing icon 33 provides more colors.
4) Tagging information related to sub-headings: Select the information related to each sub-heading and click on icon 34 to assign a color to it. Use the same colors from icon palettes 33 and 34 for information related to sub-headings as the color of sub-headings.
5) Tagging transitions: Select transitions using icon 35 and click on one of the elements in icon 38 which corresponds to the location of the transition. For example, clicking on element 1 of icon 38, places the transition between the heading and the first sub-heading. Similarly, clicking on element 4 of icon 38, places the transition between the heading and the fourth sub-heading. Right-clicking on icon 38 will cause more numbers (5, 6, 7, 8) to appear and options for colors for transitions. Since units are small, the number of transition do not tend to go beyond 4.

As an illustration of steps 2–5, reference is made to the following text.

---

A man has a head, trunk, and extremities. The head has two eyes, mouth, two ears, nose and hair. Inside the mouth there are white, pegged shaped objects called teeth. The mouth also contains a tongue which is for taste. The ears are for hearing and the nose is for smelling. The trunk has two parts, an upper trunk and a lower trunk. The lower trunk is usually larger than the upper trunk. The extremities are long and can be hairy. The extremities can get cold.

---

For this text, at step 2, the word "man" is the most general text and would be selected to form a heading. At step 3, the words "head," "trunk" and "extremities" would be selected to form three sub-headings. Each would be assigned a different color from icon palette 33. At step 4, the words "The head has two eyes, mouth, two ears, nose and hair. Inside the mouth there are white, pegged shaped objects called teeth. The mouth also contains a tongue which is for taste. The ears are for hearing and the nose is for smelling" would be selected as a sub-heading under "head." The words "The trunk has two parts, an upper trunk and a lower trunk. The lower trunk is usually larger than the upper trunk" would be selected as a sub-heading under "trunk." Similarly, the words "The extremities are long and can be hairy. The extremities can get cold" would be selected as a sub-heading under "extremities." At step 5, the word "has" after "man" would be selected as a transition and element 1 of icon 38 would be selected to place the transition between the heading and the first sub-heading.
6) Chart application: Create a top-down hierarchical chart by clicking on icon 39. The information tagged in the previous steps will position themselves as shown in FIG. 3*a*.

The heading will branch into sub-headings, the transition will position itself next to the line connecting heading and sub-headings, the information related to each sub-heading will be placed in a box connected by a line to the respective sub-headings.
7) Repeat steps 3–5 for each of the sub-headings:
   A) If "information related to sub-headings I" is branchable, then
      i) Create sub-heading II by repeating step 3.
      ii) Create "information related to sub-heading II" (by repeating step 4)
      iii) Go to step 8A.
   Information is branchable if it can be broken down into further sub-headings. For example, in FIG. 3*a*, information in boxes 41 and 42 is branchable and information in box 43 is not branchable.
   B) If information related to sub-heading I is non-branchable, then go to step 8B.
8) Chart application
   A) Select sub-heading II by using icon 35 and then clicking icon 39 if the number of sub-headings is three or more, or by clicking on icon 40.
   B) Select sub-heading II by using icon 35 and then clicking on icon 40. Each sentence is automatically placed next to an arrow line.

9) Repeat steps 2–8A continuously until information becomes non-branchable. Then apply step 8B.

Figure 3:
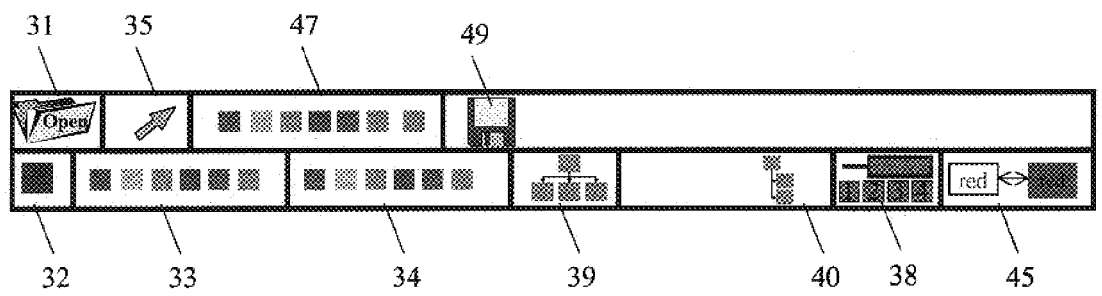
FIG. 3 shows the icons representing processing steps performed by module 1 which converts information assigned to the structural category.
Figure 3A:
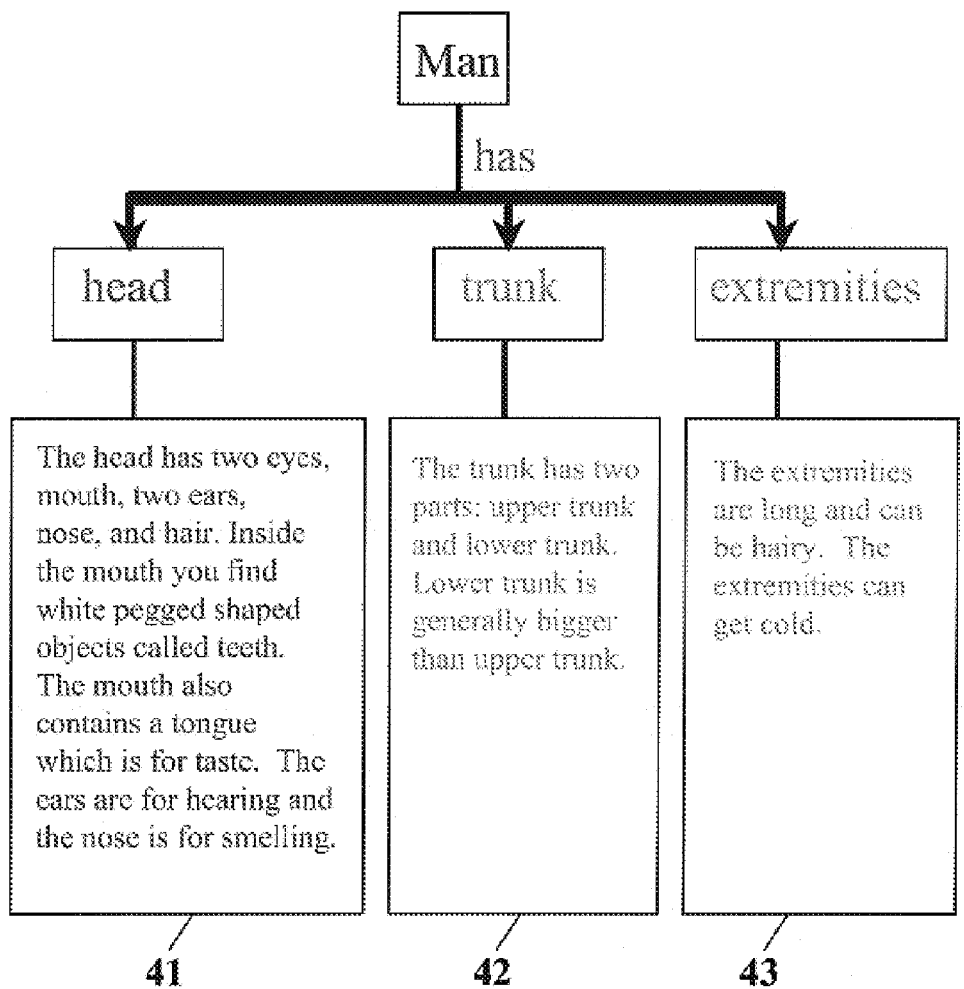
FIG. 3a shows a representative chart formed by the processing of module 1, steps 1–6.
Figure 3B:
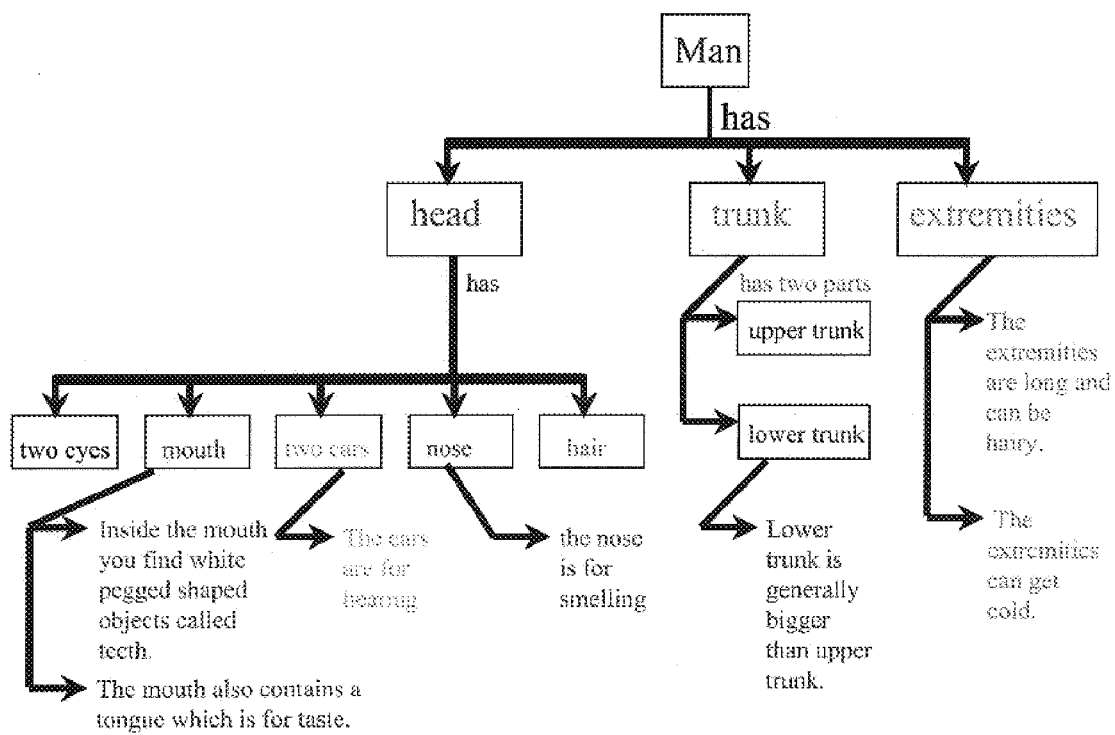
FIG. 3b shows a representative chart formed by the processing of module 1, steps 1–9.

FIG. 3b illustrates the results of module 1, steps 1–9.

10) Click on icon 45 (of FIG. 3). This will switch the colors of the fonts to background colors and switch the colors of text to black or white to make the chart easier to read.

11) Balancing colors: If two background colors are the same but their information is not directly tied together, then either element can be selected using icon 35 and changing its color by clicking on color palette of icon 47.

12) Save the document by clicking on icon 49.

END

Of course, the specific icons and arrangements shown in FIGS. 3, 3a and 3b are not important. Further, creating the necessary code to perform each of the steps described above is well within the abilities of a person skilled in the relevant art.

Module 2:

Module 2 operates to convert functional information into the invented pictorial format.

The processing performed by module 2 is described with reference to FIGS. 4 and 4a.

Begin

1) Perform the processing of module 1 except as follows.
2) Click on icon 51 to automatically attach numbers next to each sub-heading and to make a line between each sub-heading. The numbers and arrows linking the sub-headings provide information about the flow of information and the number of steps involved.
3) Click on icon 49 to save this document.

End

Figure 4:
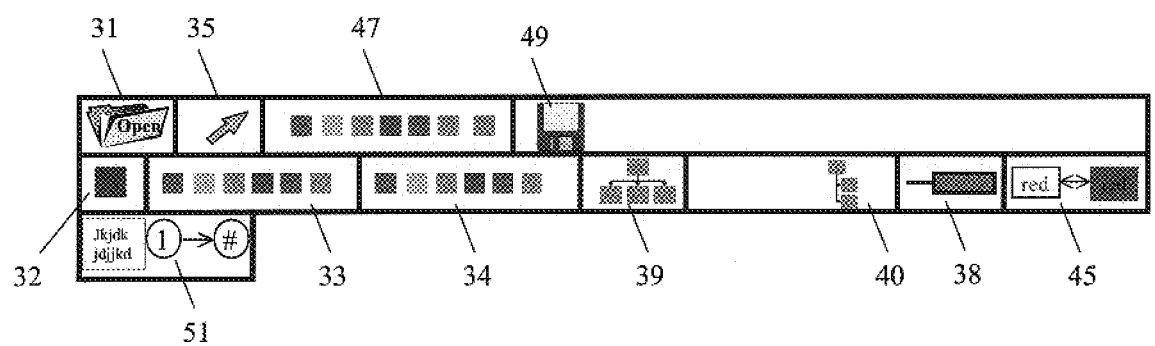
FIG. 4 shows the icons representing processing steps performed by module 2 which converts information assigned to the functional category.
Figure 4A:
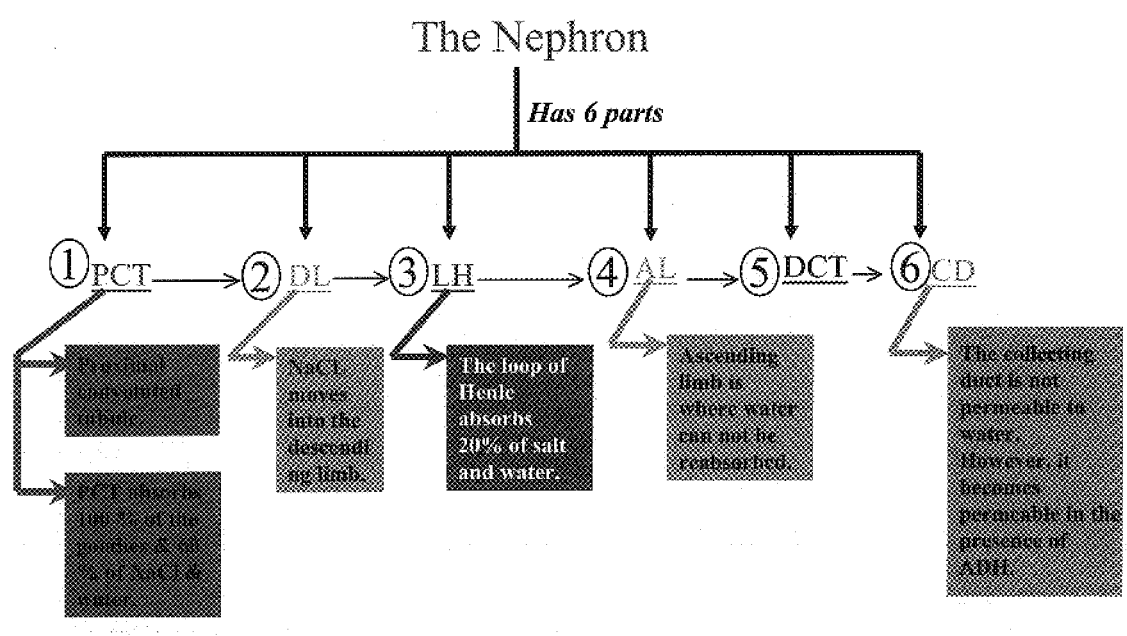
FIG. 4a shows a representative chart formed by the processing of module 2

FIG. 4a shows the results of the operation of module 2 on the following text.

---

The nephron has 6 parts: Proximal convoluted tubule. The PCT absorbs 100% of the goodies & 60% of NaCl & water. The loop of Henle absorbs 20% of salt and water. NaCl moves into the descending limb. Ascending limb is where water cannot be reabsorbed. Distal convoluted tubule is the 5th part. The collecting duct is not permeable to water. However, it becomes permeable in the presence of ADH.

---

Of course, the specific icons and arrangements shown in FIGS. 4 and 4a are not important. Further, creating the necessary code to perform each of the steps described above is well within the abilities of a person skilled in the relevant art.

Module 3A:

Module 3A operates to convert procedural information into the invented pictorial/graphical format.

The processing performed by module 3a is described with reference to FIGS. 5a–5g.

Begin

1) Utilize the same steps as described above with respect to structural information until the step of applying the chart to sub-heading, i.e., icon 39 of FIG. 4.

As an illustration of steps 2–6, reference is made to the following text.

---

There are 4 steps in graphing a straight line. How many points needed to make a line? Answer 2 points. So, we're going to plot 2 points and then connect them. Here are the steps. First, make sure the equation is in the form y = mx + b. If it isn't make it so by following the bla bla steps. Second, plot on the y-axis. Third, using the slope, plot the other points by following these steps: a) write the slope as a fraction if it already isn't. b) use the following guide: if top is + go up, if − go down, (starting at b) & if bottom is + go right, if − go left. Fourth, join the two points together.

---

Figure 5A:
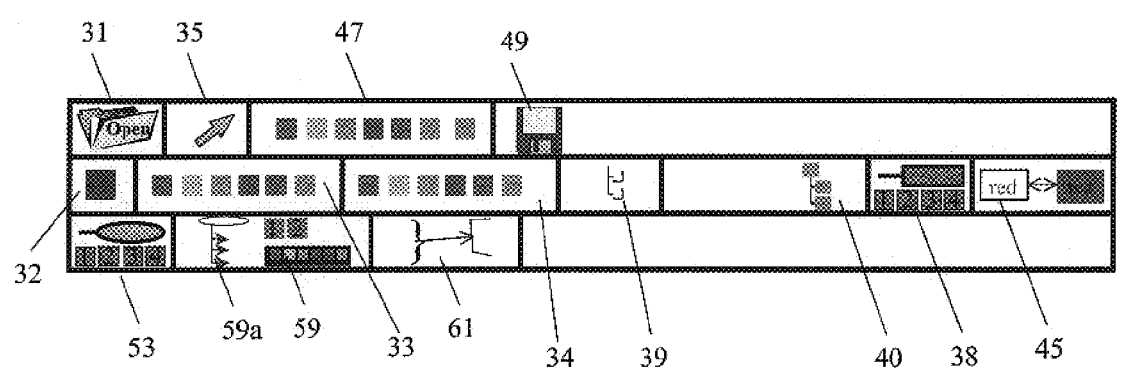
FIG. 5a shows the icons representing processing steps performed by module 3a which converts information assigned to the procedural category.
Figure 5B:
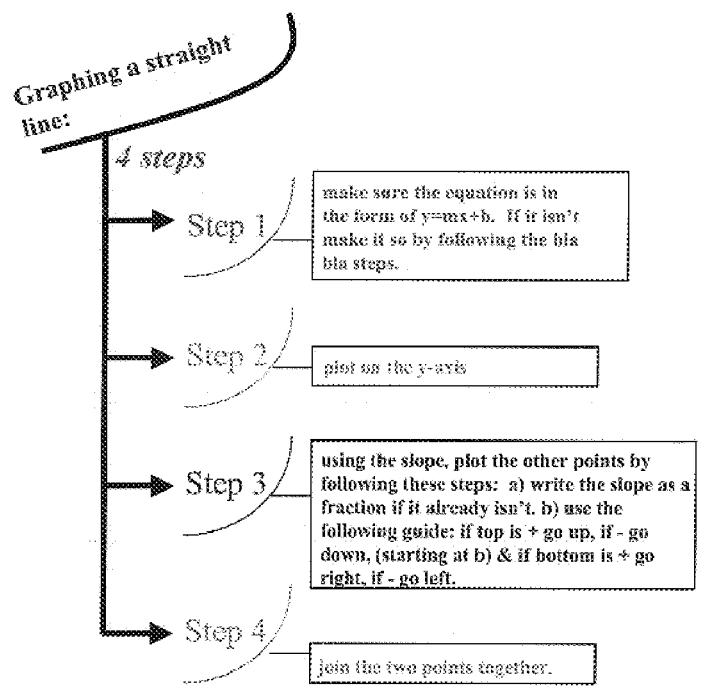

2) When applying the chart to a sub-heading by clicking on icon 51 in FIG. 5a, the chart in this case is designed to grow vertically. The left over "untagged information" 57 is kept on the side as shown in FIG. 5b.

Figure 5C:
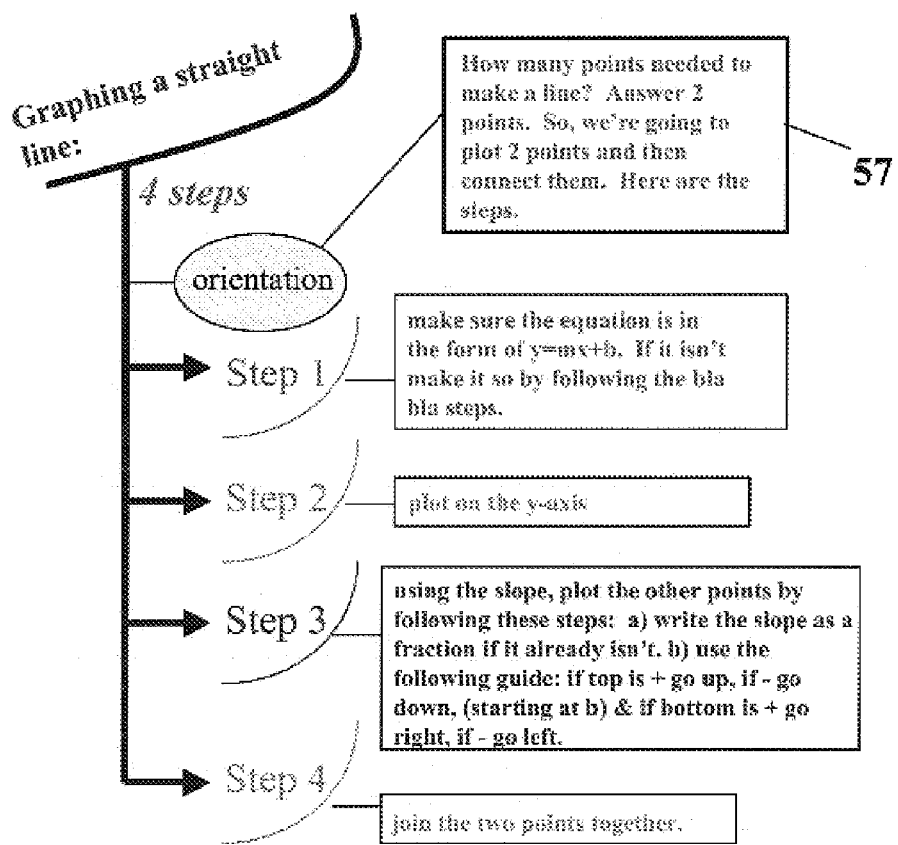

3) Dealing with the "untagged information": Next, if the "untagged" information provides some type of orientation before a particular step, use one of the elements of icon 53 to select and give the location of the orientation to be attached to the pictorial representation as shown in FIG. 5c.

Element 1 of icon 53 will position the "orientation" between the heading and sub-heading 1. Element 2 of icon 53 will position the "orientation" between sub-heading 1 and sub-heading 2 and so on.

Figure 5D:
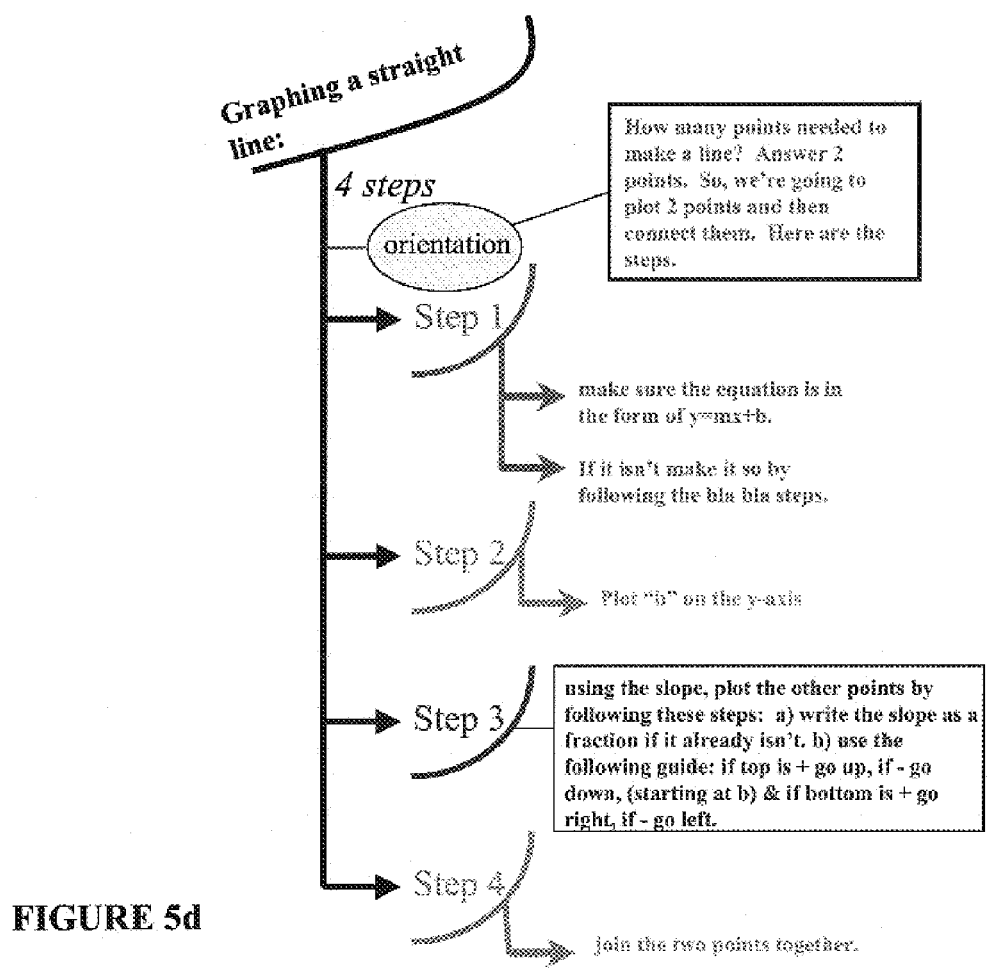

4) Applying Chart to information related to sub-headings:

Next, by holding down on the shift key and clicking on any of the steps (in this case steps 1, 2, and 4), and then clicking on icon 55 to get the results shown in FIG. 5d.

Figure 5E:
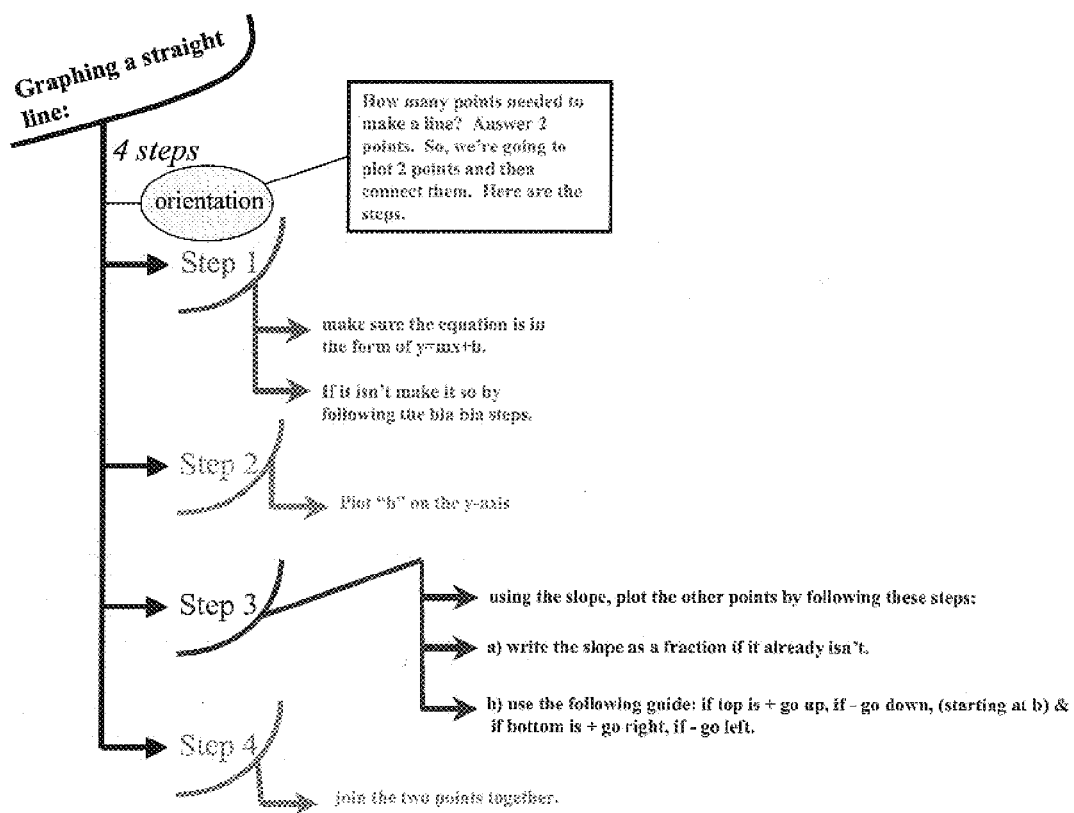

5) Continue applying chart to information related to sub-headings:

Continue applying chart to sub-heading information until all sub-heading information has been charted by selecting icon 55 to get the results shown in FIG. 5e.

Figure 5F:
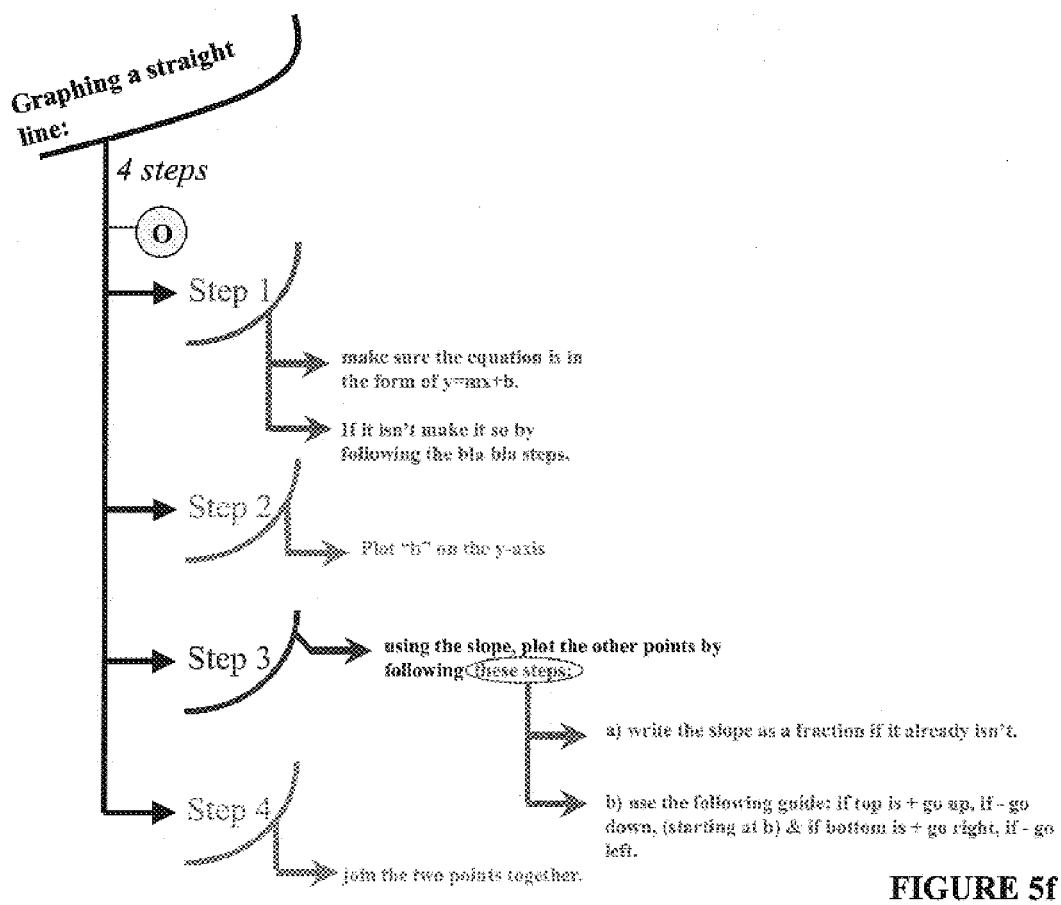
Figure 5G:
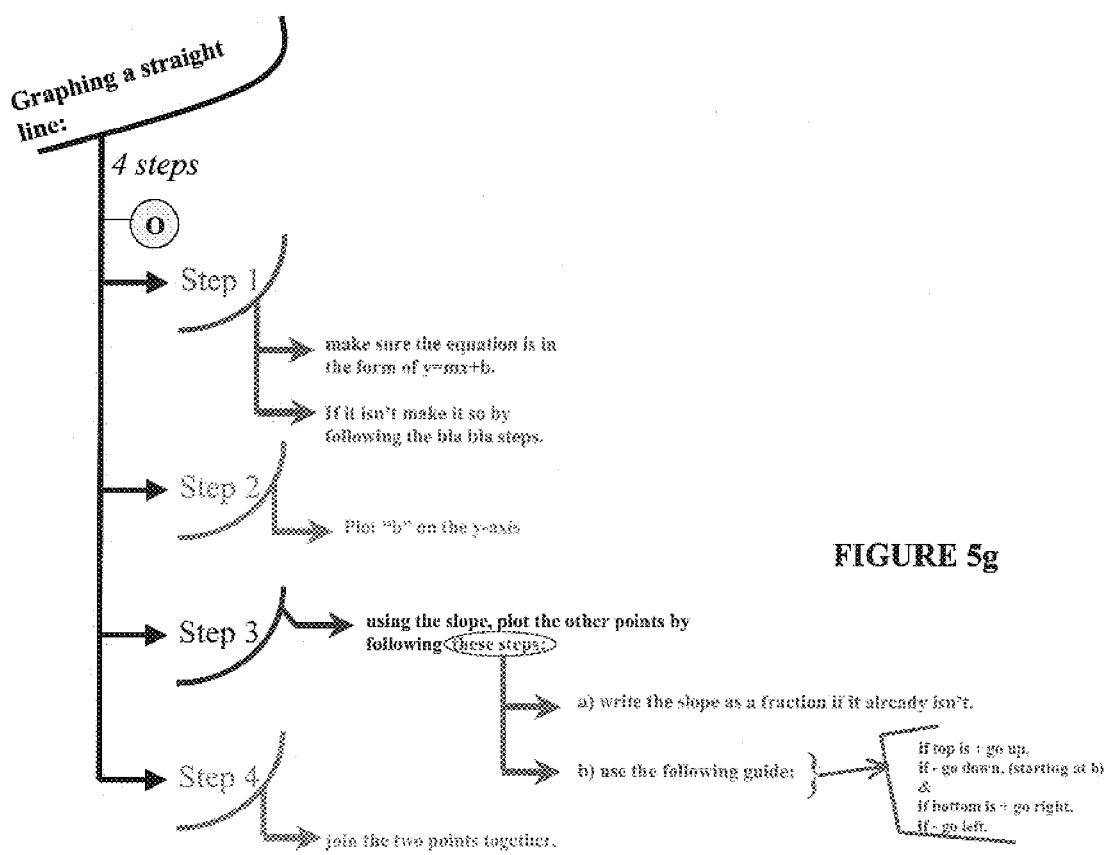
Figure 5H:
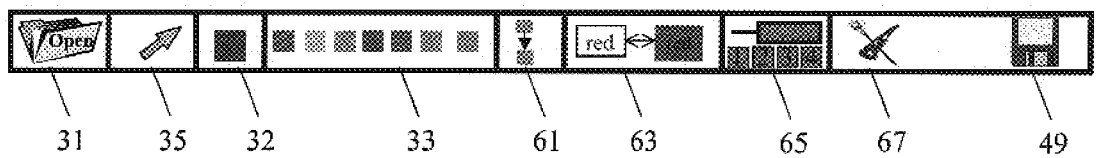
FIG. 5h shows the icons representing processing steps performed by module 3b which converts information assigned to a special case of the procedural category.

6) Attachment of children to parent:

Next, if the sub-heading information can be organized into a "parent-child" relationship, then follow these steps:

a) Highlight the children and click on icon 59, element 1. This will tag the children.

b) Next, highlight the parent and click on icon 59, element 2. This will tag the parent.

c) Next, to connect the parent with the children, click on icon 59 element 59a to produce the results shown in FIG. 5f.

d) Next, if there is further description of any of the parts is desired, select the description and click on icon 61 to get the results shown in FIG. 5g. If it is not desired to illustrate the four level description using branching arrows, just select icon 61.

END

Of course, the specific icons and arrangements shown in FIGS. 5a–5g are not important. Further, creating the necessary code to perform each of the steps described above is well within the abilities of a person skilled in the relevant art.

Module 3B:

Module 3B operates to convert procedural information into the invented pictorial format as in module 3A, but module 3B is particularly adapted for conveying directions or geographical locations as a special case of procedural information into the invented pictorial format:

The processing performed by module 3B is described with reference to FIGS. 5h–5k and with reference to the following text:

---

Directions to UCLA.
Take Pico going East, then Left on Bundy, then right on Santa Monica, then left at Westwood, when you get to the info booth, pay $5 for parking & they'll give you direction on parking.

Figure 5I:
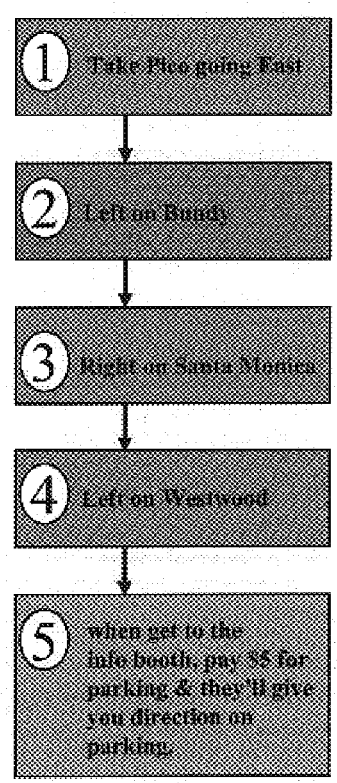
FIGS. 5i–5k show the results of the various processing steps performed by module 3b which converts information assigned to a special case of the procedural category.
Figure 5J:
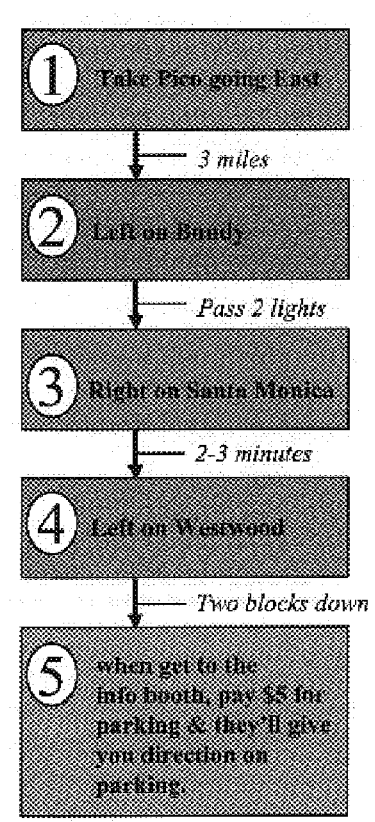
Figure 5K:
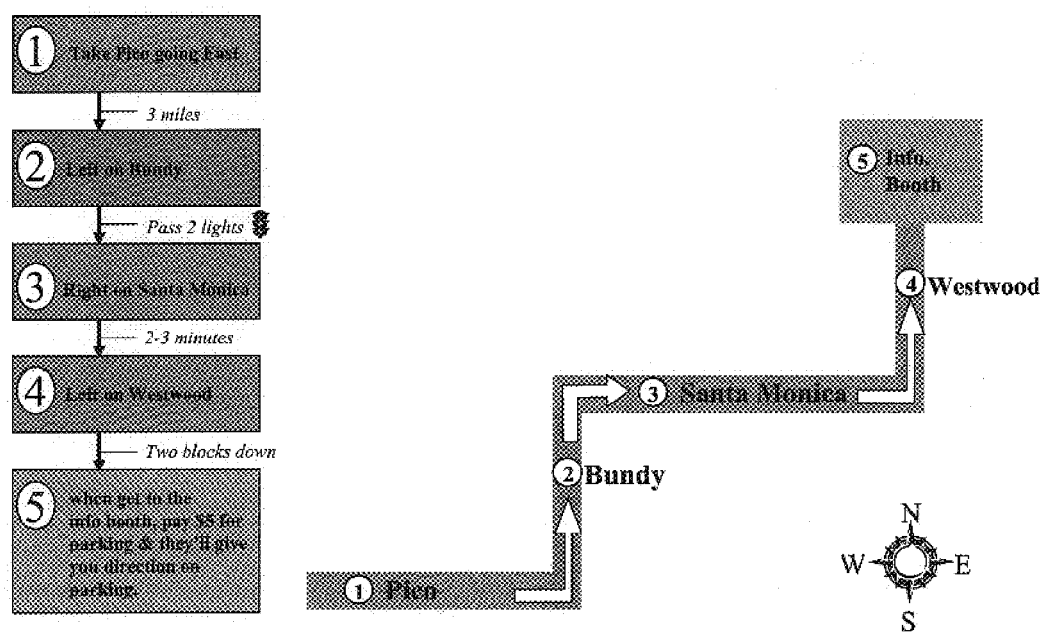

Begin
1) Open document to be converted using icon 31.
2) Tag/highlight heading using icon 32, i.e., the words "Directions to UCLA".
3) Highlight every direction using icon 33 color palette, assigning a different color to each direction. In this case there are five directions as follows: 1) "Take Pico going East", 2) "Left on Bundy", 3) "right on Santa Monica", 4) "left at Westwood", 5) "when you get to the info booth, pay $5 for parking & they'll give you direction on parking".
4) Apply chart template by clicking on icon 61. The numbers and boxes and lines will automatically be created as shown in FIG. 5i. Select untagged information using icon 35 and delete the untagged information if it is not part of the direction, i.e., in this case, the several instances of the word "then."
5) Click on icon 63 to change background color to color of text and the color of text to black.
6) Optionally place transitions (miles, time, numbers of light, street signs, . . . ) using icon 65 to produce results as shown in FIG. 5j.
7) Click on icon 67 to map the steps to a schematic pictorial representation of a road map as shown in FIG. 5k.

Features of the schematic road maps: according to the invention are that they:
  a) are schematic
  b) only use street names
  c) arrows to show direction of flow.
END Of course, the specific icons and arrangements shown in FIGS. 5h–5k are not important. Further, creating the necessary code to perform each of the steps described above is well within the abilities of a person skilled in the relevant art.

Module 4: Conversion of Time Based Information Into Pictorial Format

Module 4 operates to convert time based information into the invented pictorial format.

Figure 6:
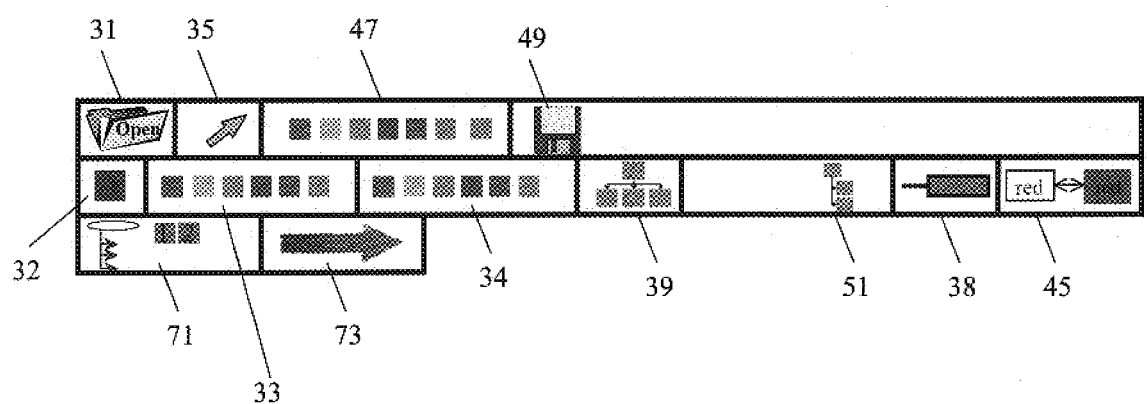
FIG. 6 show the icons representing processing steps performed by module 4 which converts information assigned to the time based category.
Figure 6A:
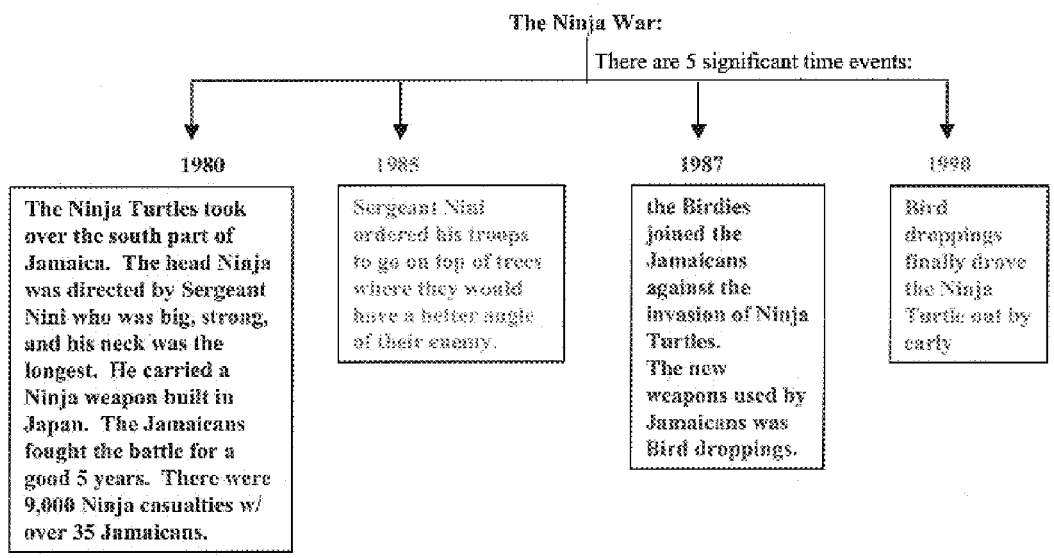
FIGS. 6a–6d show the results of the various processing steps performed by module 4.
Figure 6B:
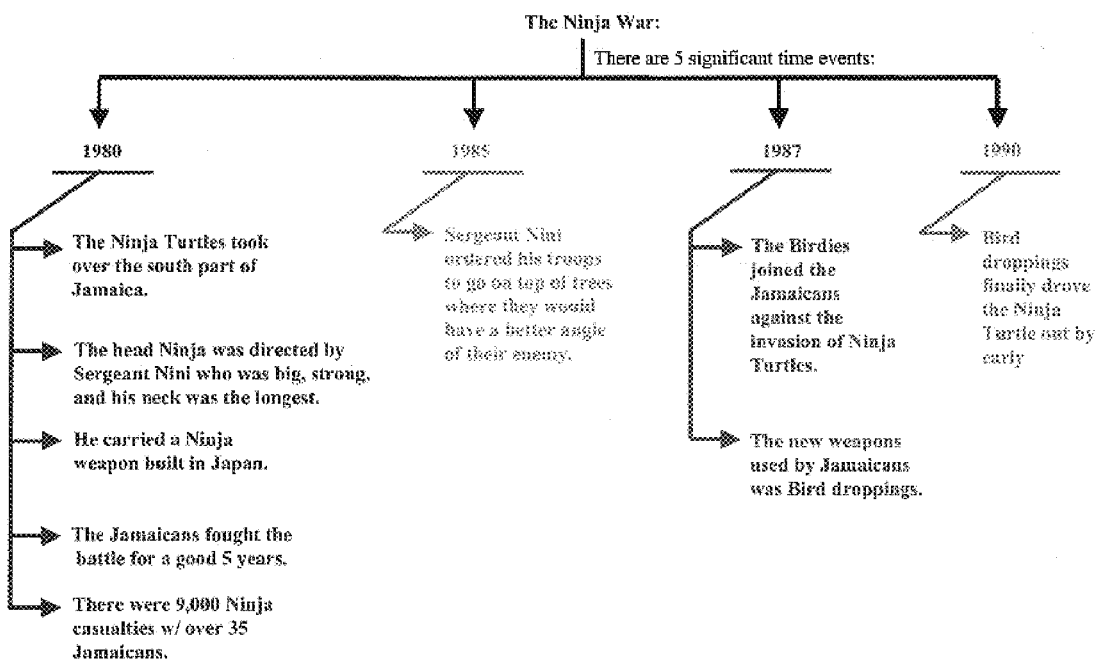
Figure 6C:
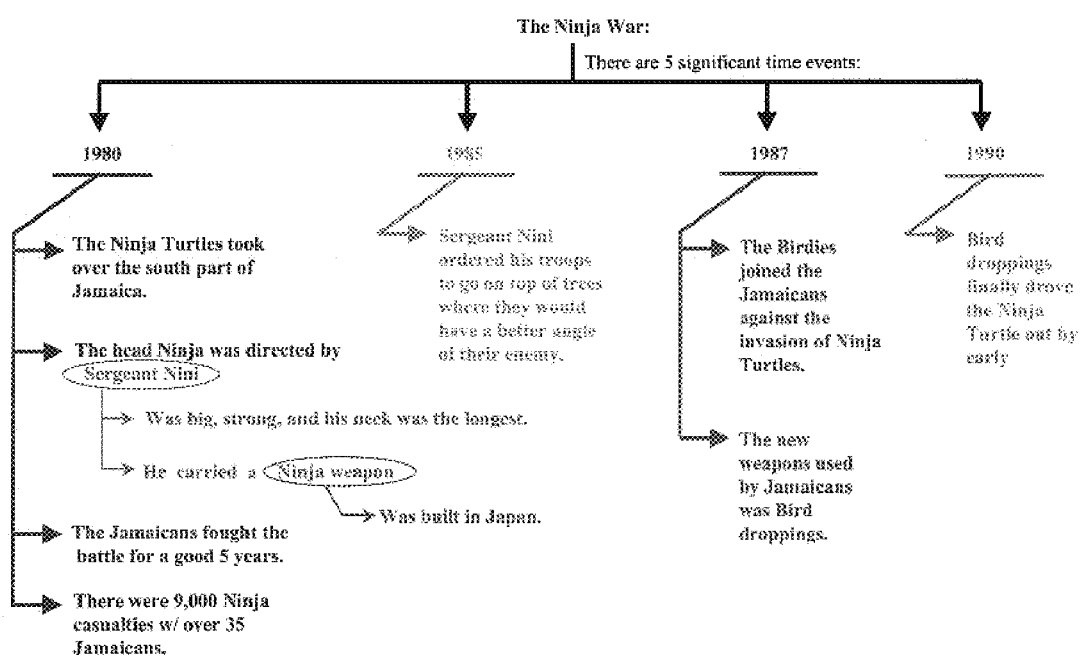
Figure 6D:
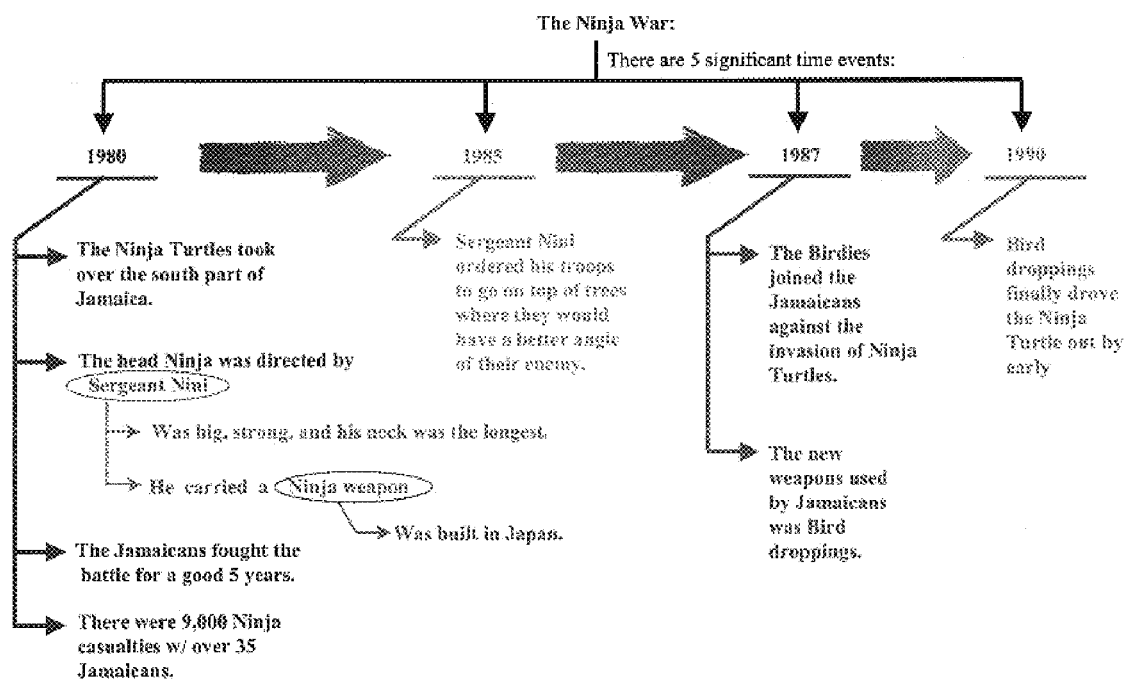

The processing performed by module 4 is described with reference to FIGS. 6–6d and with reference to the following text:

---

The Ninja War
In 1980, The Ninja Turtles took over the south part of Jamaica. The head Ninja was directed by Sergeant Nini who was big, strong, and his neck was the longest. He carried a Ninja weapon built in Japan. The Jamaicans fought the battle for a good 5 years. There were 9,000 Ninja casualties with over 35 Jamaicans. In 1985, Sergeant Nini ordered his troops to go on top of trees where they would have a better angle of their enemy. In 1987, the Birdies joined the Jamaicans against the invasion of Ninja Turtles. The new weapons used by Jamaicans was Bird droppings. Bird droppings finally drove the Ninja Turtles out by early 1990s.

---

Begin
1) Same as steps 1–10 of module 1. The only difference is that at step 3, the dates or times corresponding to significant time events are highlighted by selecting them using icon 35 and then assigning them as sub-headings by using icon color palette 33. Then information corresponding to the significant time events is selected and assigned corresponding colors from icon color palette 34 as in step 4 of module 1. The result will be as shown in FIG. 6a. Then, using icon 35, select the information corresponding to sub-headings and click on icon 40. This will convert the pictorial representation shown in FIG. 6a where each sentence becomes separated as illustrated in FIG. 6b.
2) Each sentence can be further broken down by highlighting a parent using element 1 of icon 71 and highlighting a child using element 2 of icon 71. Then click on icon 71 a to map the relation. The results are shown in FIG. 6c
3) Click on icon 73 to place arrows indicating direction of timeline as shown in FIG. 6d.
4) Click on icon 45. This will switch the colors of the fonts to background colors and switch the colors of text to black or white to make the chart easier to read.
5) Save the document by clicking on icon 49.
END Of course, the specific icons and arrangements shown in FIGS. 6–6d are not important. Further, creating the necessary code to perform each of the steps described above is well within the abilities of a person skilled in the relevant art.

Module 5: Conversion of Event Information Into Pictorial Format

Module 5 operates to convert event based information into the invented pictorial format.

The processing performed by module 5 is described with reference to FIGS. 7–7e and with reference to the following text:

---

The Ninja War
The beginning of the battle occurred in summer of 1980. The Ninja Turtles took over the south part of Jamaica. The head Ninja was directed by Sergeant Nini who was big, strong, and his neck was the longest. He carried a Ninja weapon built in Japan. The Jamaicans fought the battle for a good 5 years. There were 9,000 Ninja casualties with over 35 Jamaicans. The middle of the battle occurred some time in 1985, Sergeant Nini ordered his troops to go on top of trees where they would have a better angle of their enemy. The stage before the end of the war was marked by 1987, the Birdies joined the Jamaicans against the invasion of Ninja Turtles. The new weapons used by Jamaicans was Bird droppings. The end of the battle occurred when Bird droppings finally drove the Ninja Turtles out by early 1900s.

---

Event based information has two types of possibilities:
1) structural events
2) flowing events

Structural Events

The steps employed to create pictorial representations for structural events is the same as steps 1)–4) of the time based events according to module 4 except that instead of selecting the dates or times corresponding to significant time events and highlighting and assigning colors to them as described above, and then associating the corresponding information, the major events or turning points are selected as the subheadings, and the corresponding information is associated with the subheadings as described above. The result is shown in FIG. 7a.

Flowing Events

Figure 7:
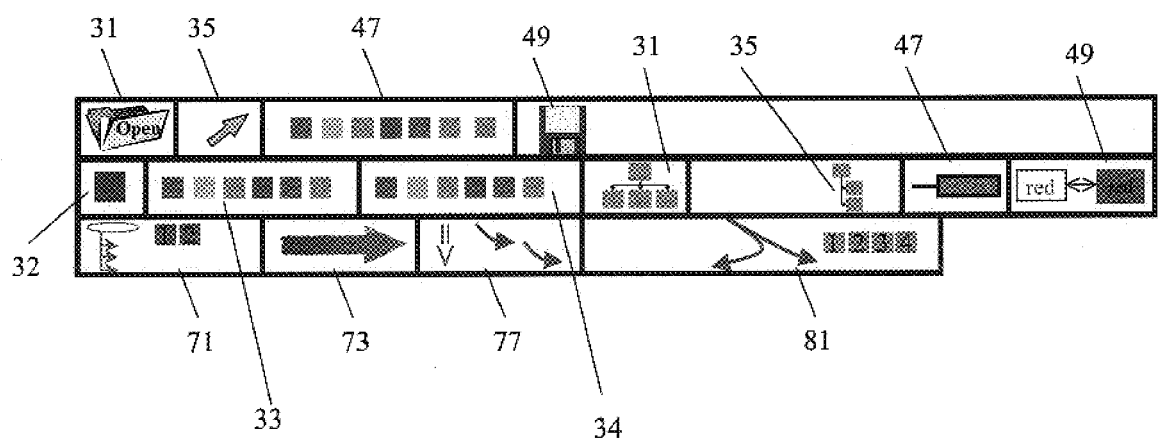
FIG. 7 show the icons representing processing steps performed by module 5 which converts information assigned to the event based category.
Figure 7A:
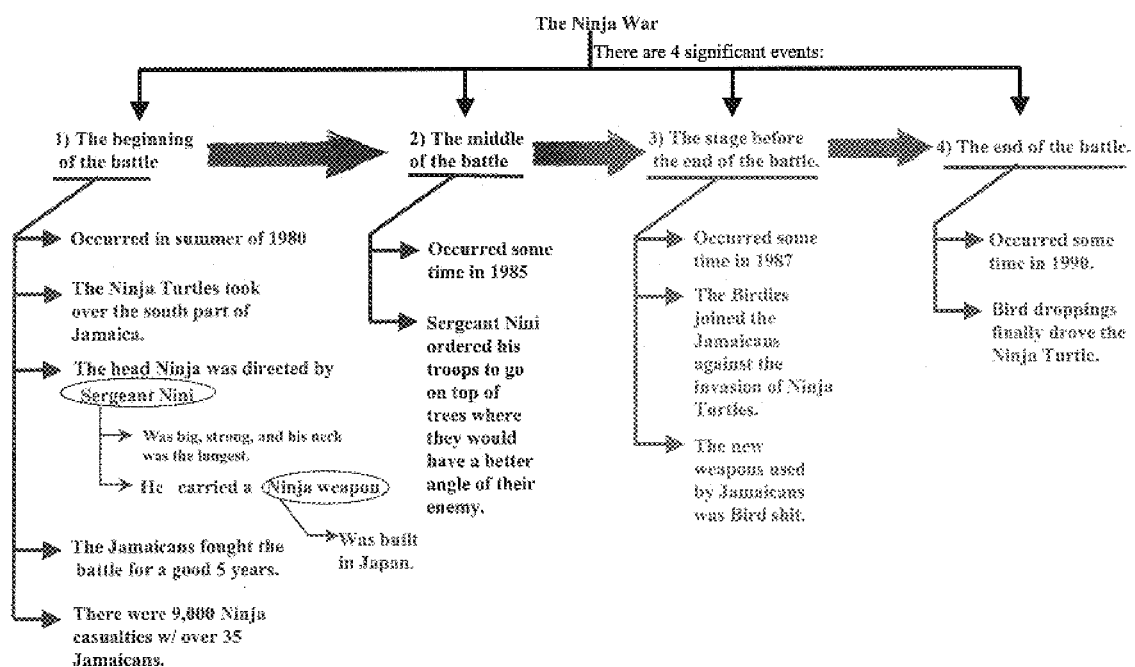
FIGS. 7a–7e show the results of the various processing steps performed by module 5.
Figure 7B:
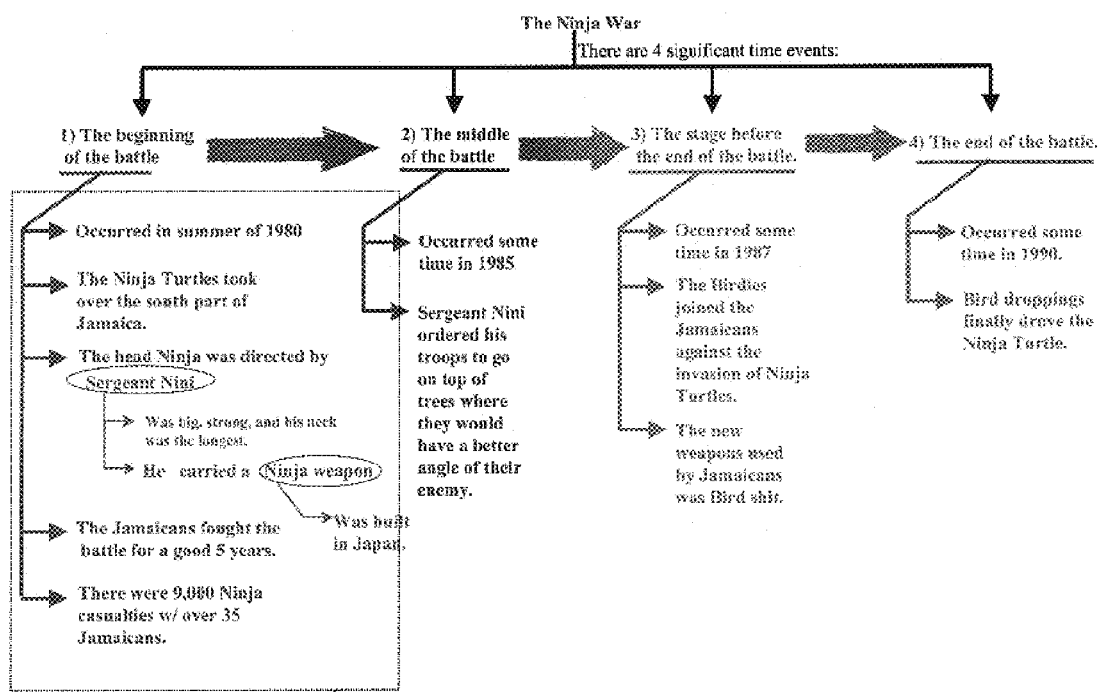
Figure 7C:
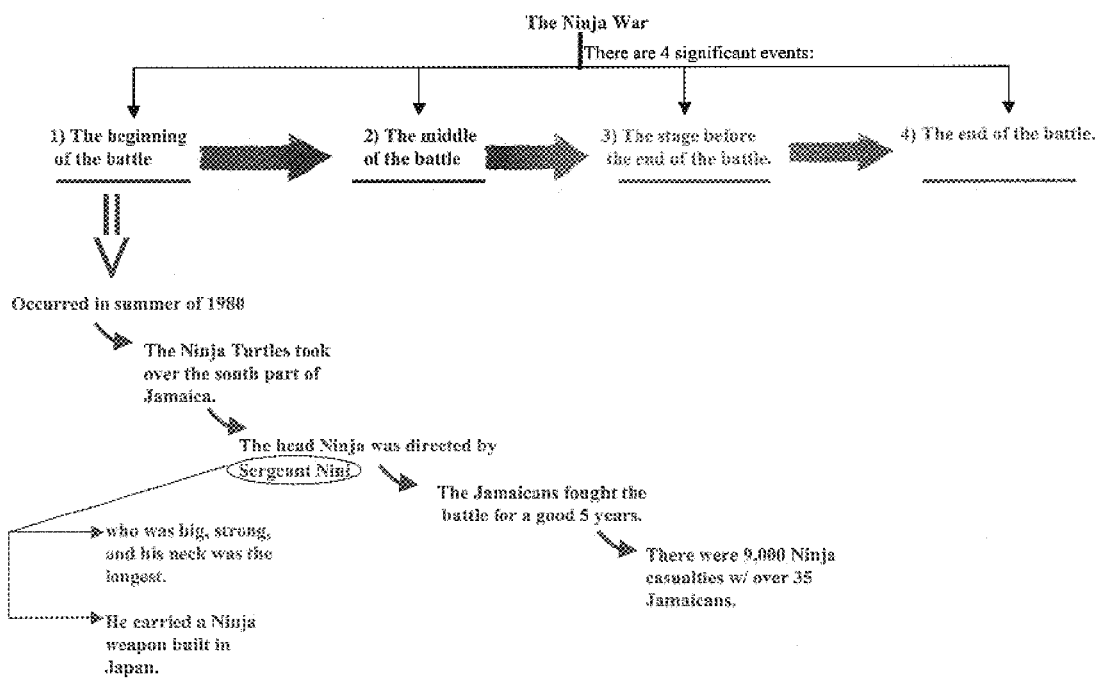

Begin
1) Start with structural event already developed as described above and shown in FIG. 7a.
2) Select the section under sub-heading 1 using icon 75 thereby creating selection box 79 as shown in FIG. 7b.
3) Click on icon 77 to automatically change to "flowing event" format as shown in FIG. 7c which shows the result for only the information in selection box 79. This may be repeated for the information pertaining to the other significant events corresponding to the other sub-headings.
4) Click on icon 45 to add color background to the text.
End If the event takes two or more paths, use event bifurcation tool icon 81.

Begin

Figure 7D:
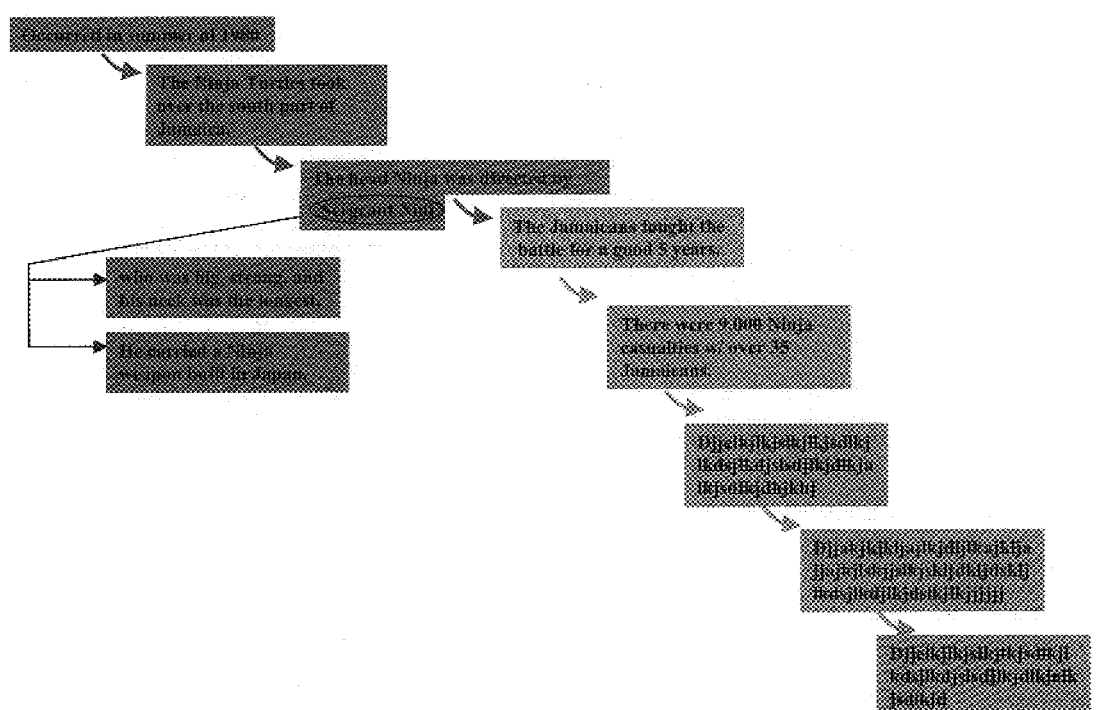

1) Highlight the starting point of bifurcation using labeled 1 of icon 81.
2) Select and highlight the start and finish of each of the first paths of the flowing events using element 2 of icon 81 to produce the results shown in FIG. 7*d*.
3) Select and highlight the start and finish of the second path of the flowing events using element 2 of icon 81.
4) If there are more paths, continue highlighting the start and finish of each part using element 3 or a higher numbered element of icon 81. Right-clicking on the region containing icon 81 provides more numbers and colors.
5) Click on the chart element portion of icon 81 to produce the results shown in FIG. 7*e*.
6) Save the document by clicking on icon 49.

End

Figure 7E:
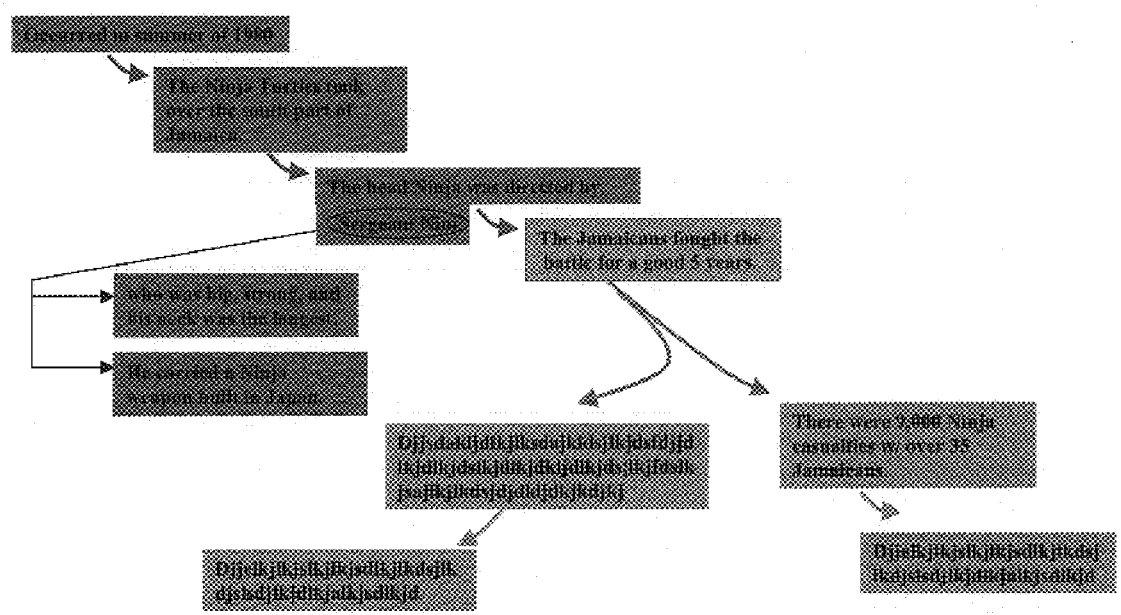

Of course, the specific icons and arrangements shown in FIGS. 7–7*e* are not important. Further, creating the necessary code to perform each of the steps described above is well within the abilities of a person skilled in the relevant art.

Module 6: Conversion of Images

Module 6 operates to convert images into the invented pictorial format.

The processing performed by module 6 is described with reference to FIGS. 8–8*j*. There are two possible formats. Both formats may be presented giving the user the option to view both formats.

Format 1 is used where it is desired to display images in a hierarchical arrangement.

Begin

Figure 8A:
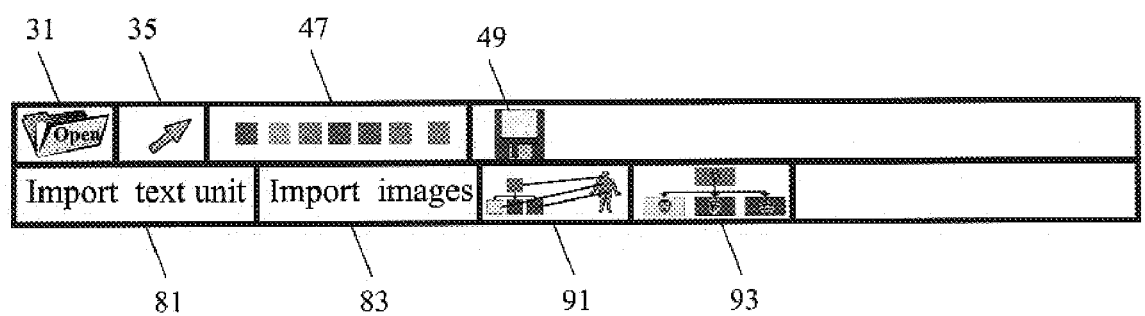
FIG. 8a shows the icons representing the processing steps performed by module 6 which converts images in a first format.

1) Import text unit by clicking on icon 81 of FIG. 8*a*.
2) Create or obtain picture applicable to heading="heading picture".
3) Create or obtain pictures applicable to sub-headings= "sub-heading pictures".
4) Create or obtain pictures applicable to sentences=optional depending on availability of pictures.

Steps 2), 3) and 4) are needed only if it is desired to utilize images in addition to any obtained by step 1.

Figure 8B:
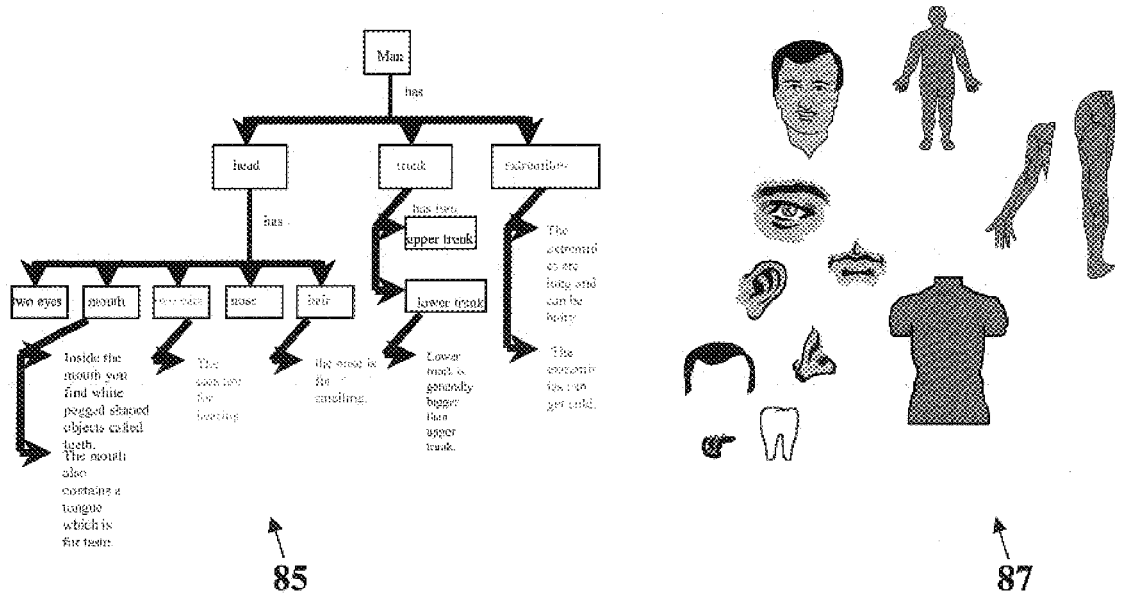
FIGS. 8b–8d show the results of the various processing steps performed by module 6 for converting images in the first format.
Figure 8C:
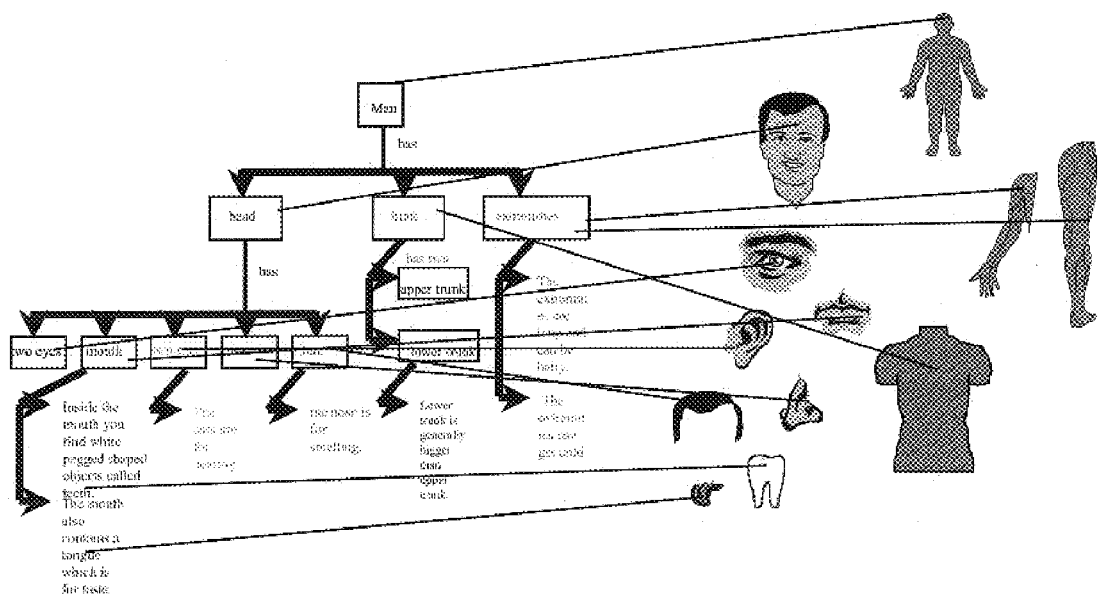
Figure 8D:
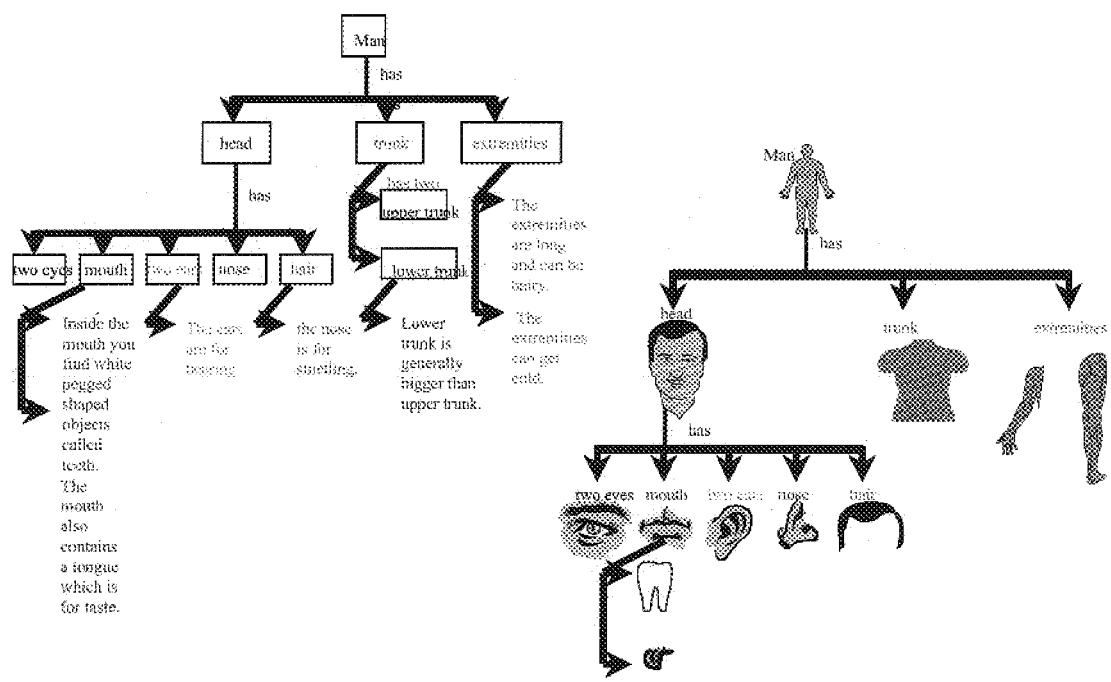

5) Next, import the images by clicking on icon 83 (FIG. 8*a*). The result of steps 1–5 is shown in FIG. 8*b* where portion 85 is the unit saved after module 1 processing and imported by clicking on icon 81 and portion 87 is the images obtained during pre-conversion module II.
6) Use icon 91 (FIG. 8*a*) to link the images to their corresponding text elements as shown in FIG. 8*c* by connecting the text and image elements using a mouse or other pointing device.
7) Click on icon 93 (FIG. 8*a*) to produce a chart from the images as shown in FIG. 8*d*.

End

Format 2 is used where it is desired to display images in an exploded view format.

Begin

Steps 1–5 are the same as described above with reference to FIGS. 8*a*–8*d* and Format 1.

Figure 8E:
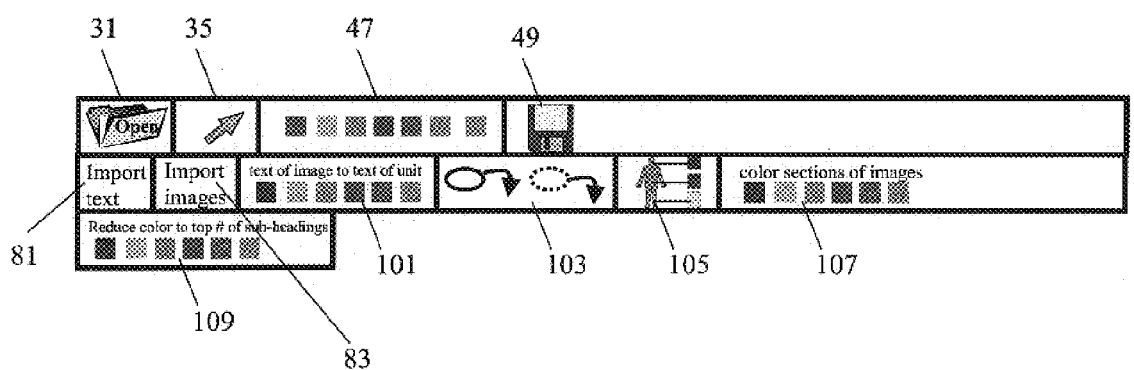
FIG. 8e shows the icons representing the processing steps performed by module 6 which converts images in a second format.
Figure 8F:
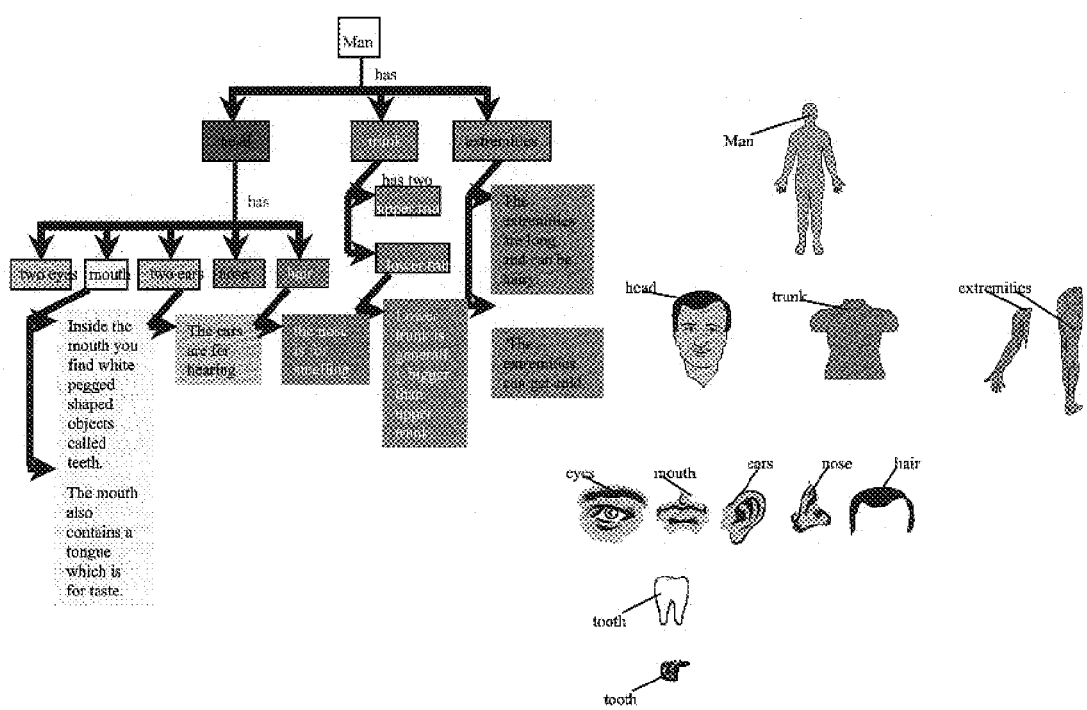
FIGS. 8f–8j show the results of the various processing steps performed by module 6 for converting images in the second format.
Figure 8G:
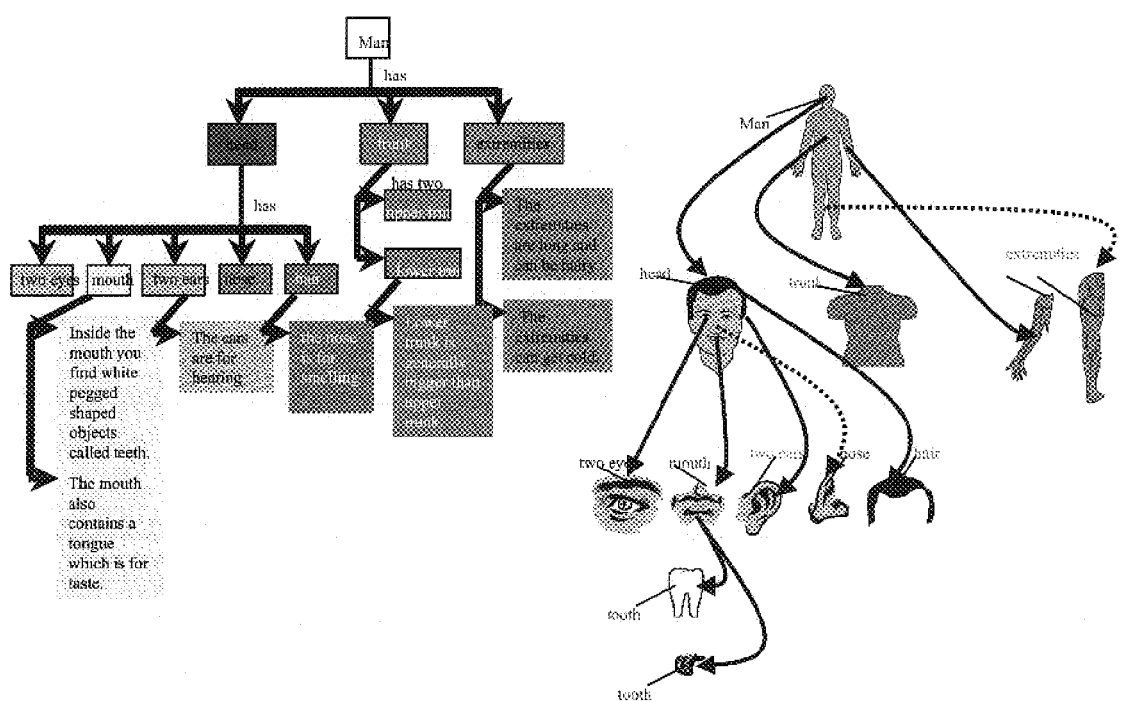
Figure 8H:
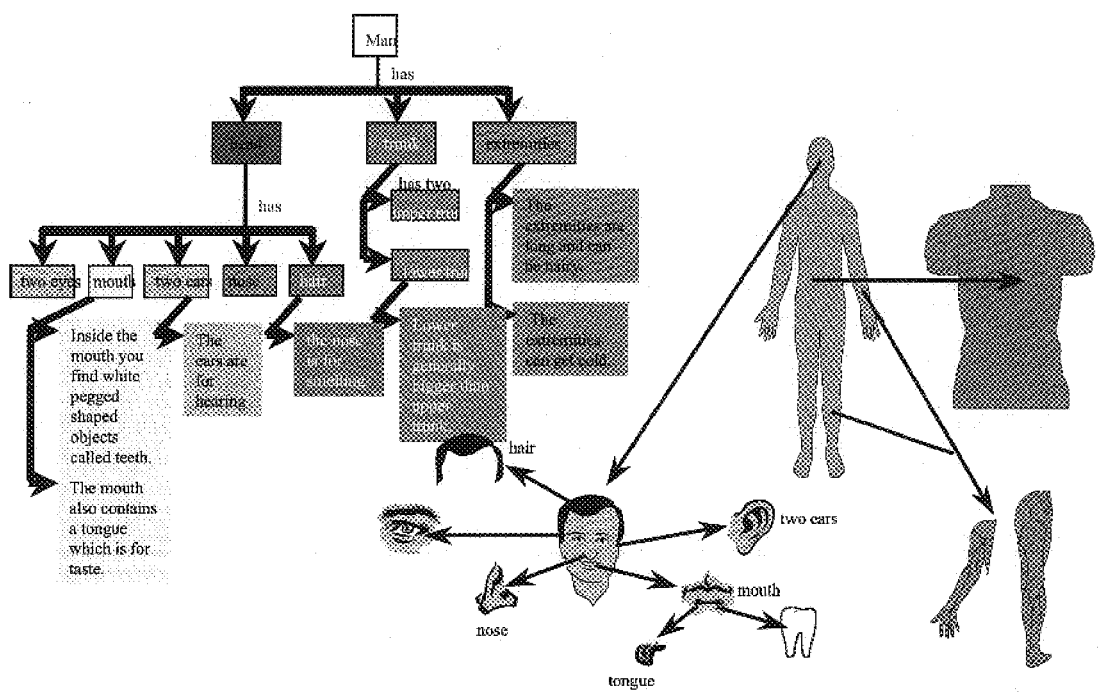
Figure 8I:
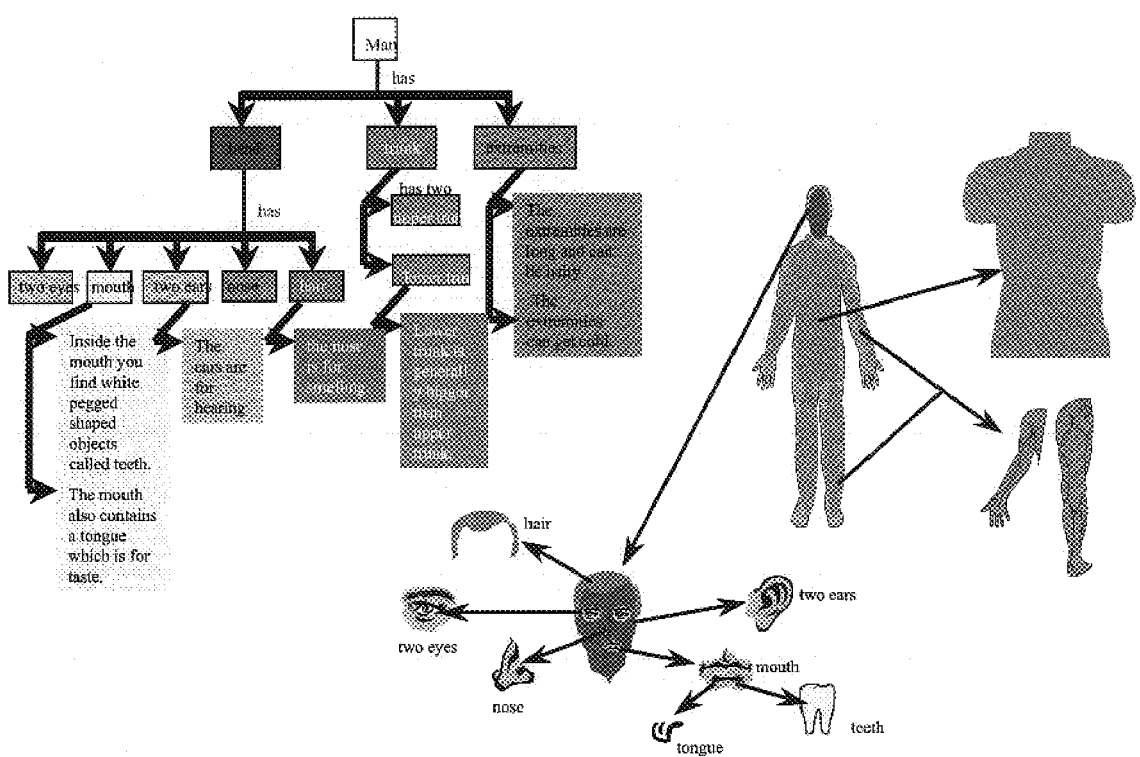
Figure 8J:
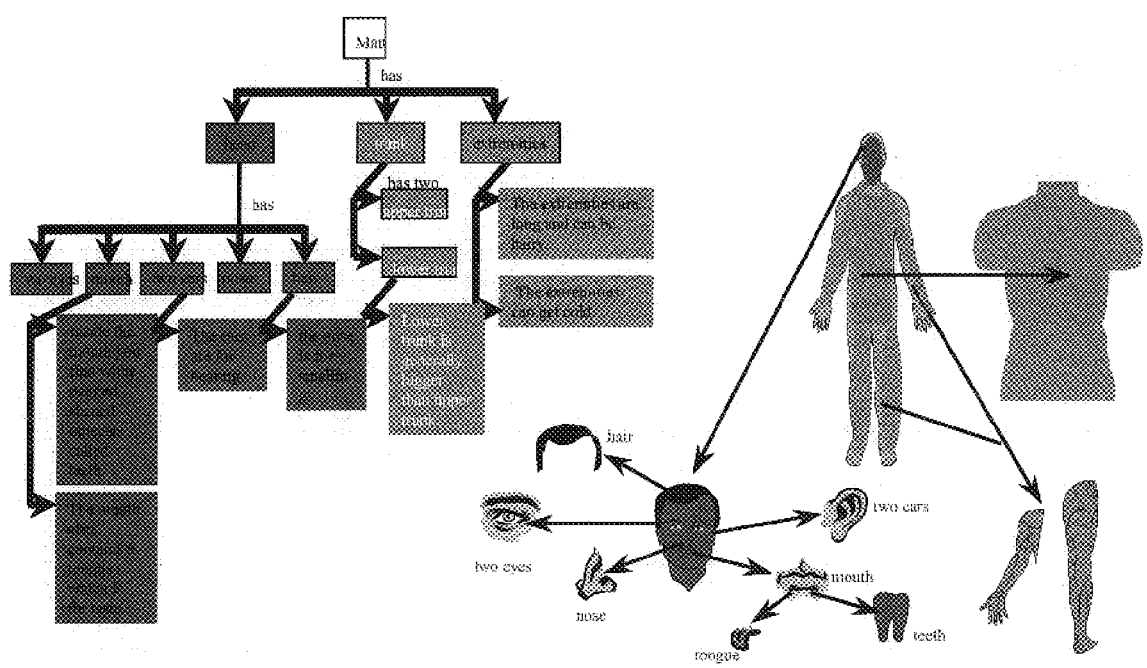

6) Referring to FIGS. 8*e* and 8*f*, color code information on text identifying images (i.e., the words "head", "trunk", "extremities", etc.), corresponding to text information (i.e., description shown in text boxes) by using icon 101 color palette.
7) Use either element in icon 103 to create a parent-child relationship among images. The only difference between the elements in icon 103 is to use dotted lines if lines cross as shown in FIG. 8*g* to make it easier to follow the images connected by the lines.
8) Click on icon 105 to apply chart to images as shown in FIG. 8*h* and save by clicking on icon 49. This is done to make the parent-child relationship easier to follow.
9) Color code image parts to its corresponding text unit as shown in FIG. 8*i* using icon 107 and save using icon 49. This is to color the images with the same color as the text describing the image parts.
10) Create fewer colors using icon 109: a) Color the information related to sub-headings level 1 equal to the color of sub-headings 1. b) Color-code the images corresponding to colors of the text unit as shown in FIG. 8*j* and save using icon 49. This is to show the end user how the images and text relate to each other at a high level.

End

Of course, the specific icons and arrangement of the icons shown in FIGS. 8*a*–8*j* are not important. Further, creating the necessary code to perform each of the steps described above is well within the abilities of a person skilled in the relevant art.

Module 7: Linking the Invented Pictorial/graphical Text and Images Together, if Desired.

Module 7 operates to link text converted by one of modules 1–5 and images converted by module 6 to form a single text with images document in the invented pictorial/ graphical format.

The processing performed by module 7 is described with reference to FIGS. 9–9*g*.

For all three forms of images saved by module 6 (i.e., FIGS. 8*h*, 8*i* and 8*j*), perform the following steps where the three forms are three text and image formats referred to as format 1, format 2 and format 3. In format 1, as shown in FIG. 9*c*, the images are arranged hierarchically with associated text. In format 2, as shown in FIG. 9*e* the images are arranged in an exploded view with associated text preserved with low level associations. In format 3, as shown in FIG. 9*g*, the images are arranged in an exploded view with associated text preserved with high level associations.

The three different formats are used to provide alternate mechanisms for viewing the same information enhancing the meaning of the content of the document by showing how the parts of information relate to each other in different orientations.

Begin

Figure 9:
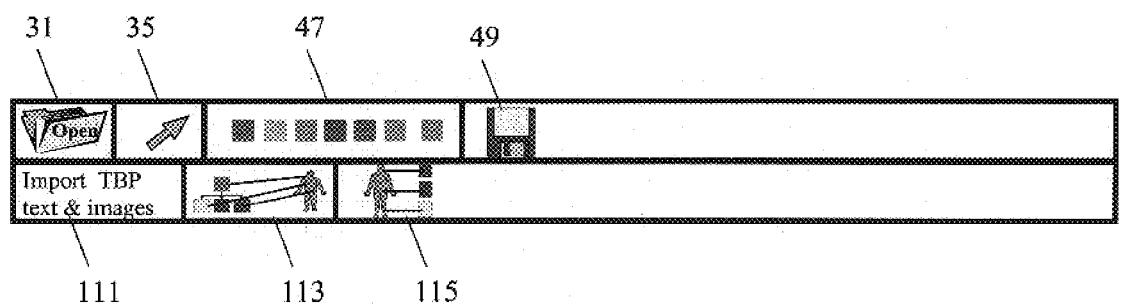
FIG. 9 shows the icons representing the processing steps performed by module 7 which links text converted by one of modules 1–5 and images converted by module 6.
Figure 9A:
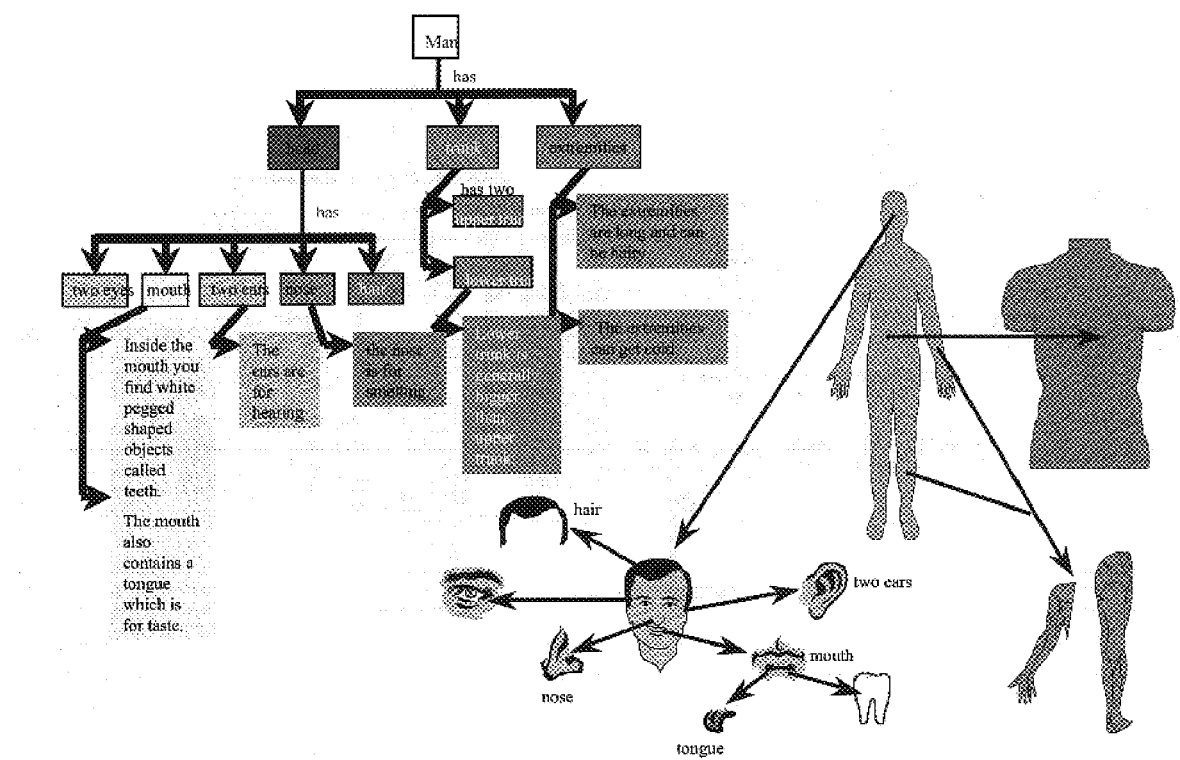
FIGS. 9a–9g show the results of the various processing steps performed by module 7.
Figure 9B:
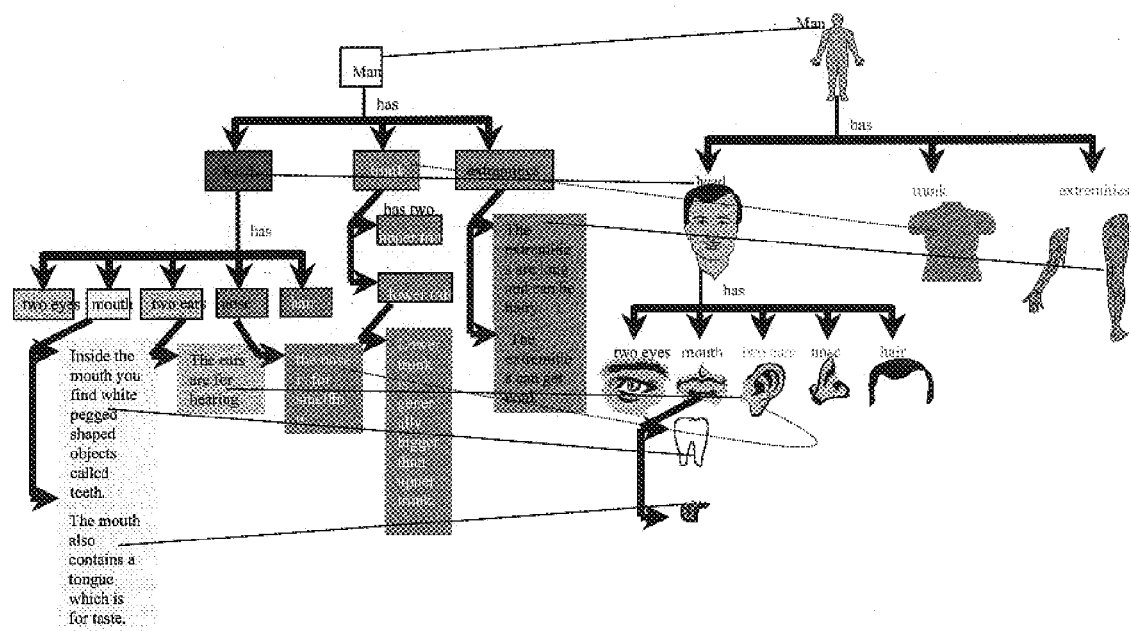
Figure 9C:
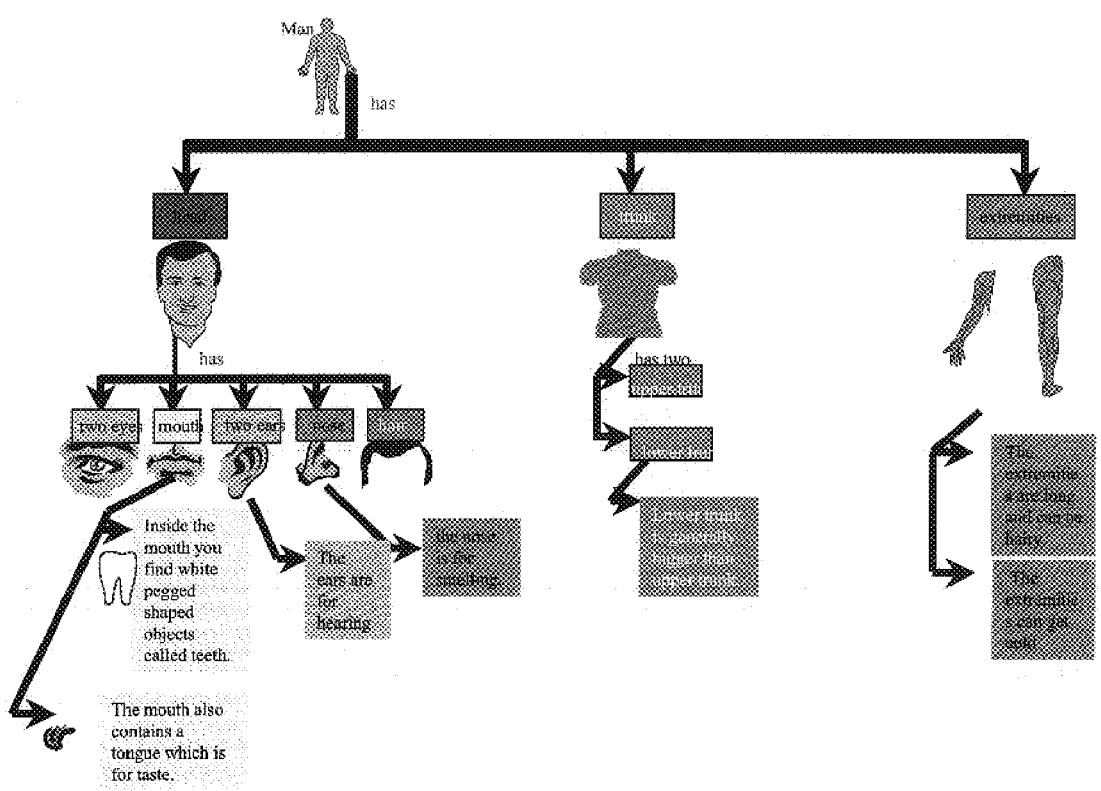

1) Import the pictorial/graphical text and image of type format 1 by clicking on icon 111 as shown in FIG. 9. This will produce results as shown in FIG. 9*a*
2) Click on icon 113 to link text to images to produce the results shown in FIG. 9*b*. The links are formed by manually connecting the desired text and images using a mouse or other pointing device.
3) Click on icon 115 to link text to images to automatically produce the results shown in FIG. 9*c*.

End

Figure 9D:
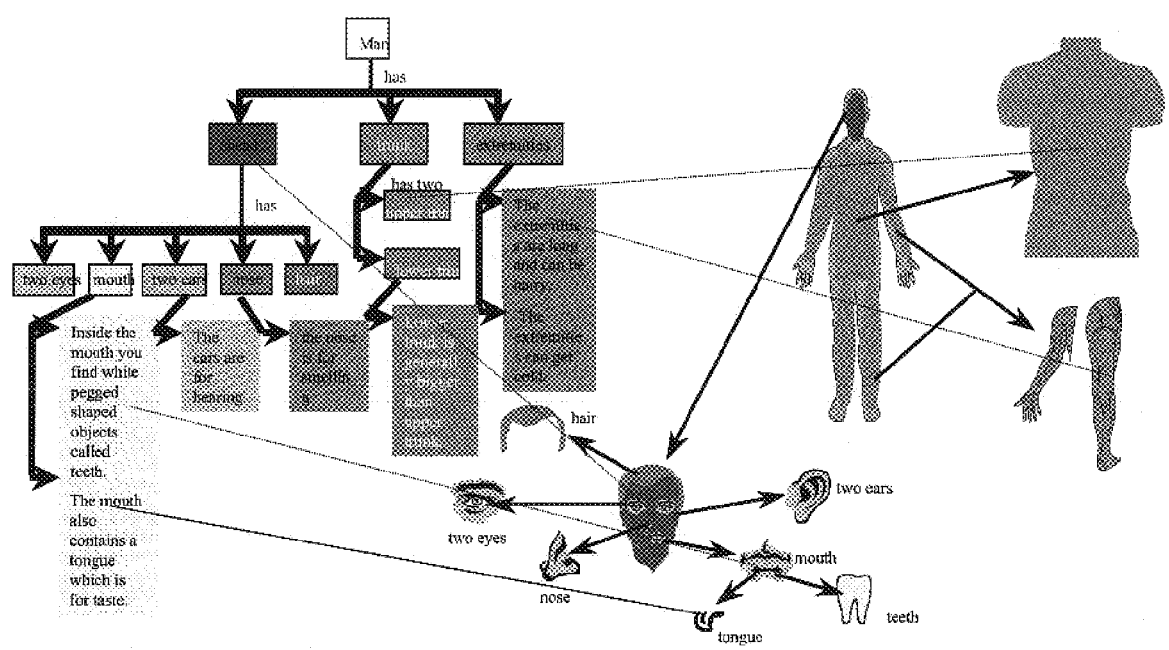
Figure 9E:
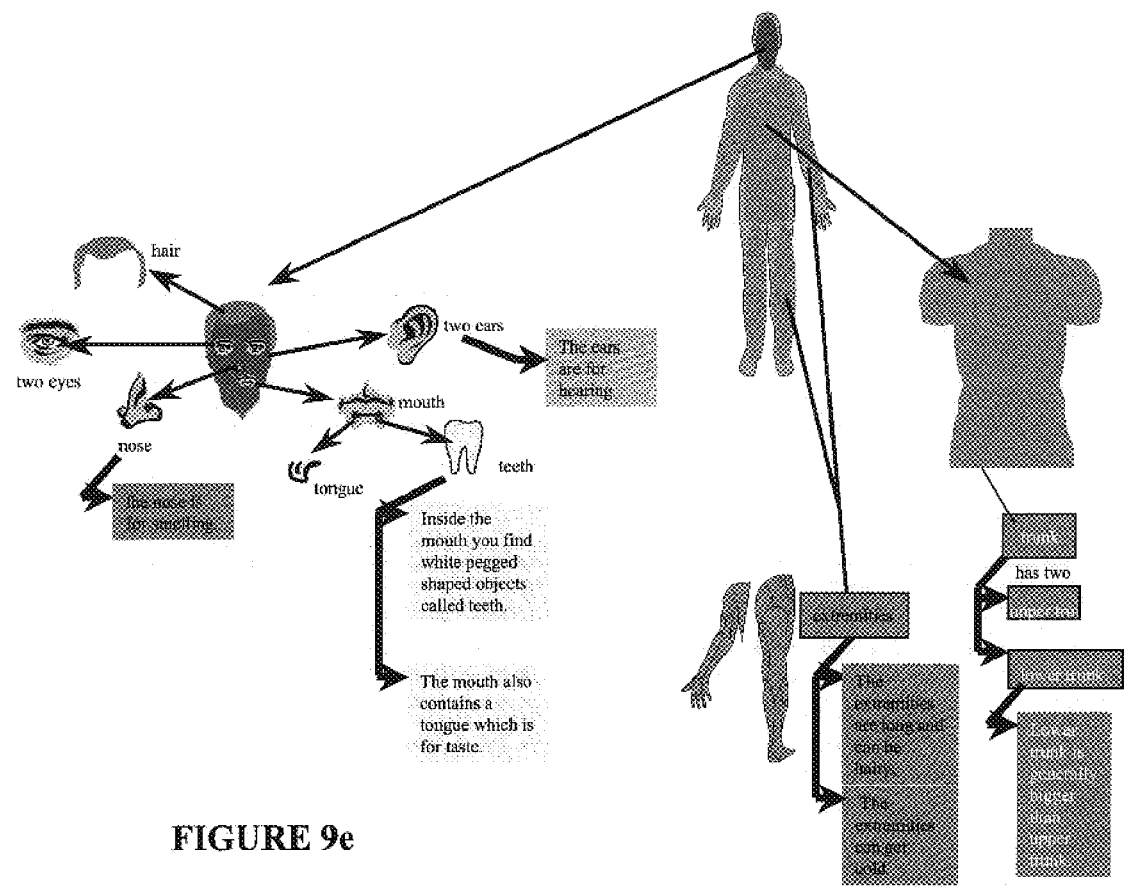

For format 2, the steps are the same, but step 2 produces the results shown in FIG. 9*d* and 9*e*.

Figure 9F:
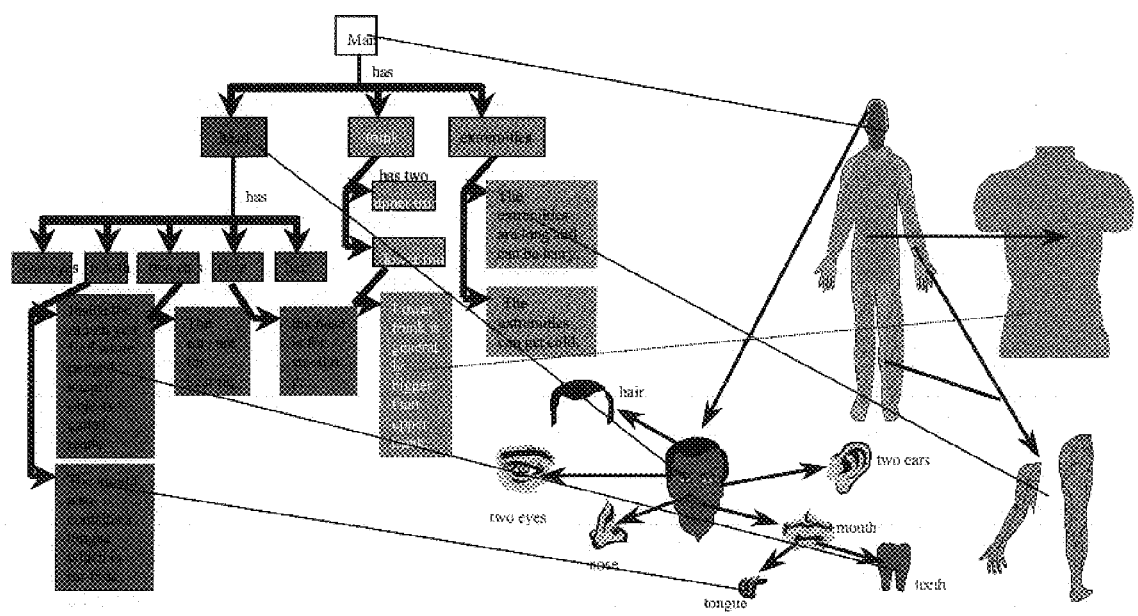
Figure 9G:
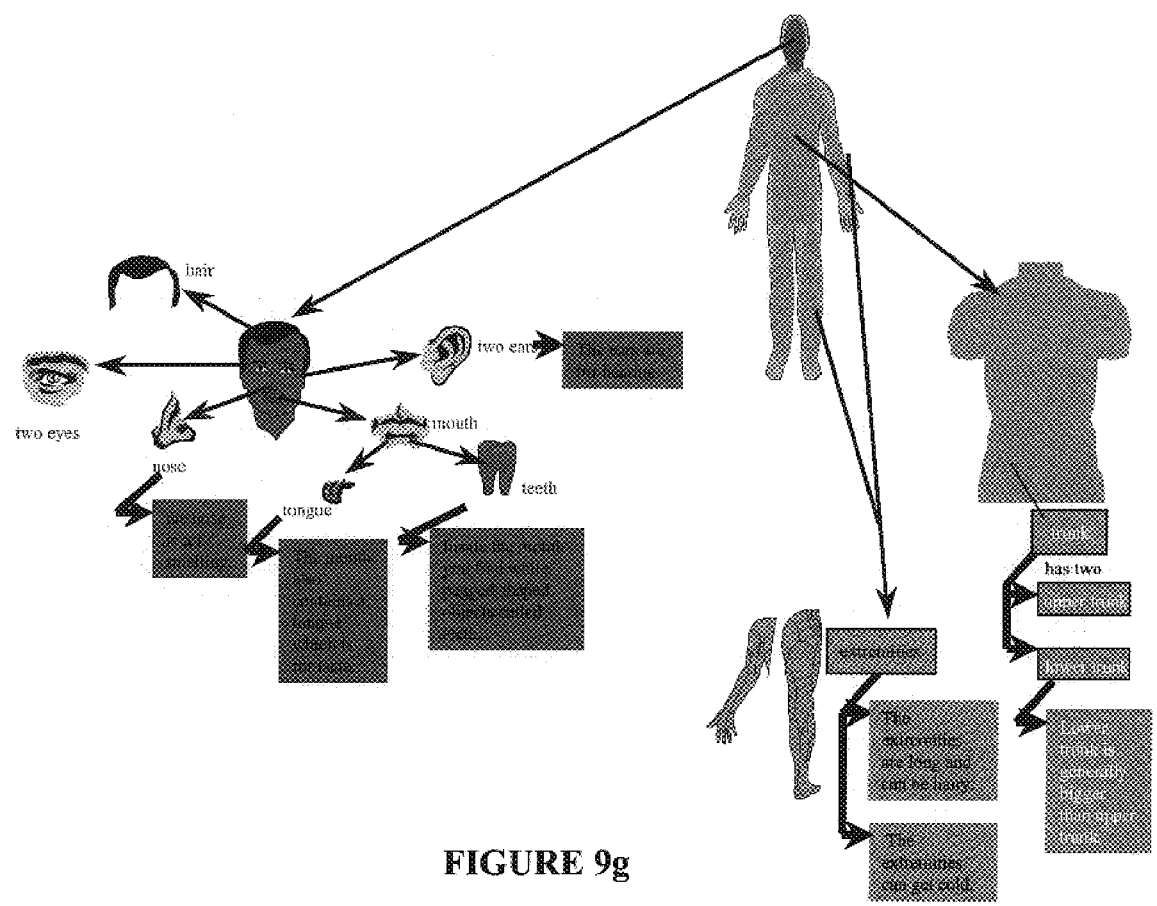

For format 3, the steps are the same, but step 3 produces the results shown in FIG. 9*f* and 9*g*.

Of course, the specific icons and arrangements of icons shown in FIGS. 9–9*g* are not important. Further, creating the necessary code to perform each of the steps described above is well within the abilities of a person skilled in the relevant art.

Module 8: Collaboration—Creating Multiple Hierarchies

Figure 10:
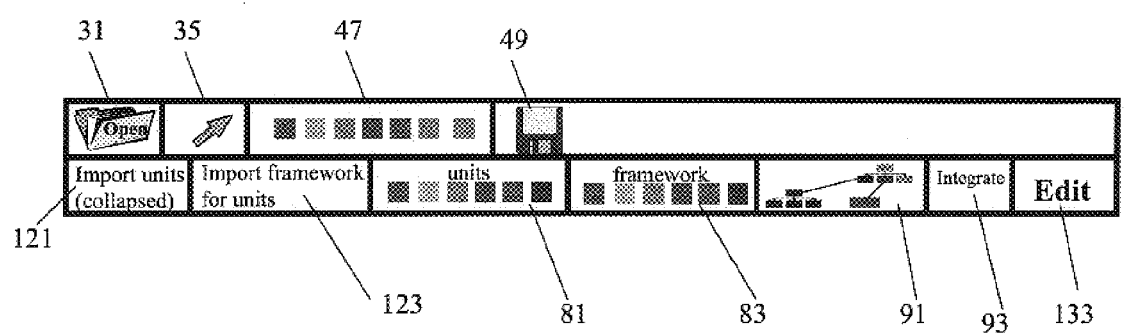
FIG. 10 shows the icons representing the processing steps performed by module 8 which creates multiple hierarchies useful for collaboration.
Figure 10A:
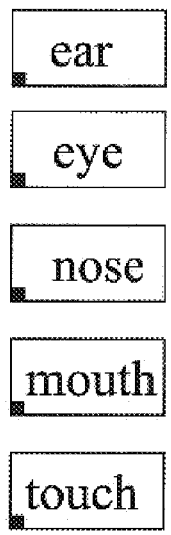
FIGS. 10a–10g show the results of the various processing steps performed by module 8.
Figure 10B:
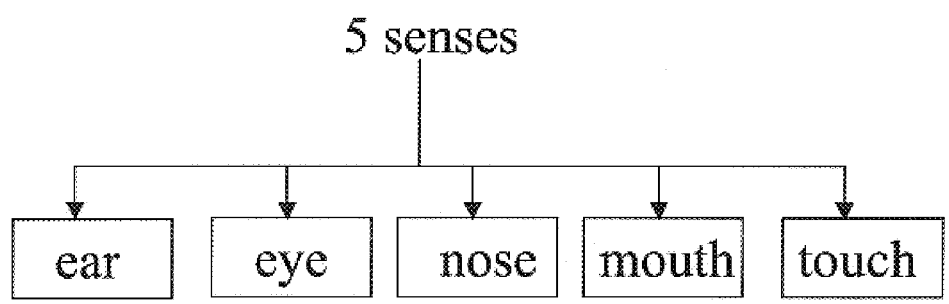
Figure 10C:
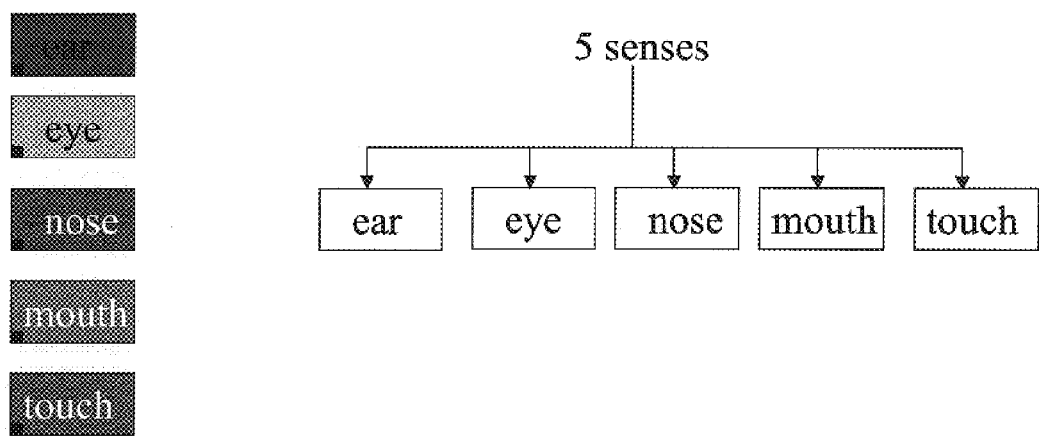
Figure 10D:
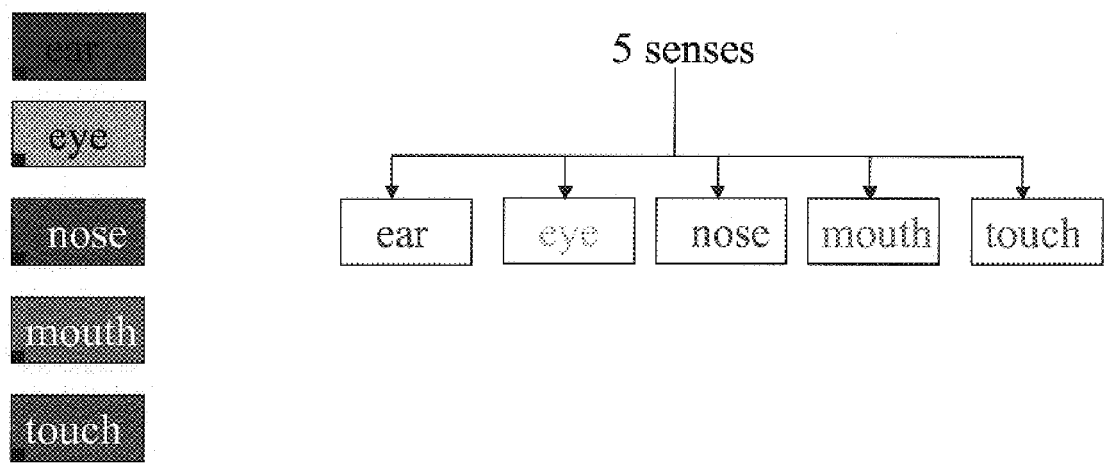
Figure 10E:
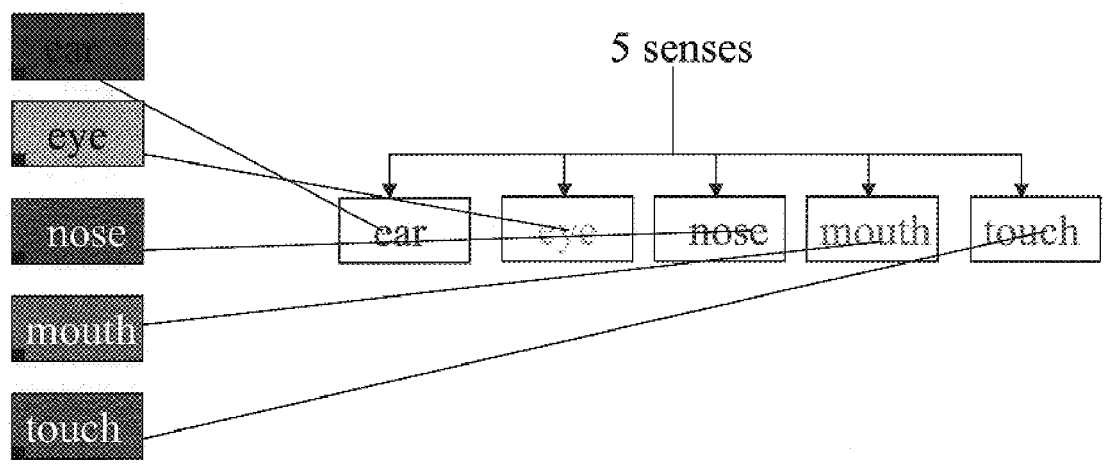
Figure 10F:
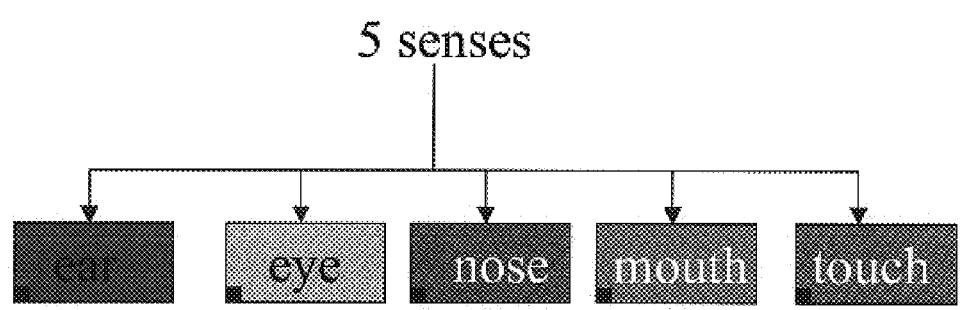

Once processing by modules 1–6 has been completed, module 8 operates to bring together separately created information blocks into a single information block. To do this, the first step is to collapse each separate information block so that each is represented by a single icon. Techniques to do this are well known to persons skilled in the art.
BEGIN
1) Click on icon 121 to import the "collapsed units" needed to be linked and turned into a hierarchy. Assuming it is desired to create an information block relating to the five senses, the result is shown in FIG. 10*a*.
2) Click on icon 123 to import the "framework for the units". This was created by one of the S,T,E,P, or F conversion modules. The result is shown in FIG. 10*b*.
3) Click on icon 81 to highlight the "collapsed unit," assigning a different color to each of the units shown in FIG. 10*c*.
4) Click on icon 83 to highlight the "framework for the units" so that the information blocks 141 are associated with a corresponding framework unit 143 as shown in FIG. 10*d*.
5) Click on icon 91 to link the "collapsed units" to their respective position in the "framework" by using a mouse or other pointing device as shown in FIG. 10*e*.
6) Click on icon 93 to integrate the "collapsed units" into the framework as shown in FIG. 10*f*.
7) This entire framework can itself be collapsed and integrated into a yet larger framework, which repeats the process starting with Step 1. For example, the five senses can be collapsed and integrated into a larger framework called Sensory and Motor Systems, which in turn could be collapsed and integrated into a larger framework or module called Anatomy. Anatomy could further be collapsed and integrated into a larger module called Biological Sciences. Biological Sciences can be collapsed and integrated with other "mega-modules" such as Physical Sciences and Earth Sciences to create Science. The Science module can be further collapsed with other supersets of modules such as Math to create Math and Sciences. Math and Sciences modules may further be collapsed and integrated with History and Humanities as well as other modules to create World Knowledge. This modular process can be repeated multiple times, thus allowing for massive scalability. This also represents a "bottom-up" development of content.

Figure 10G:
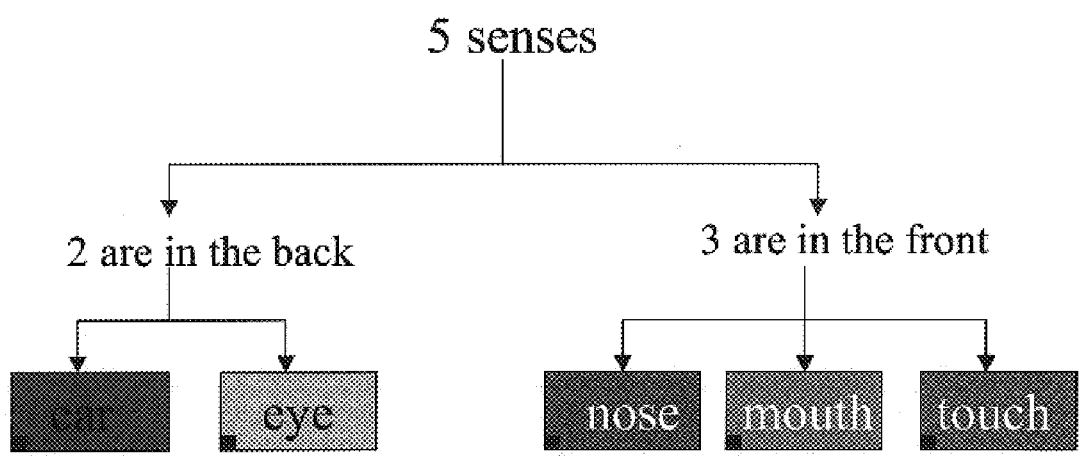
Figure 11:
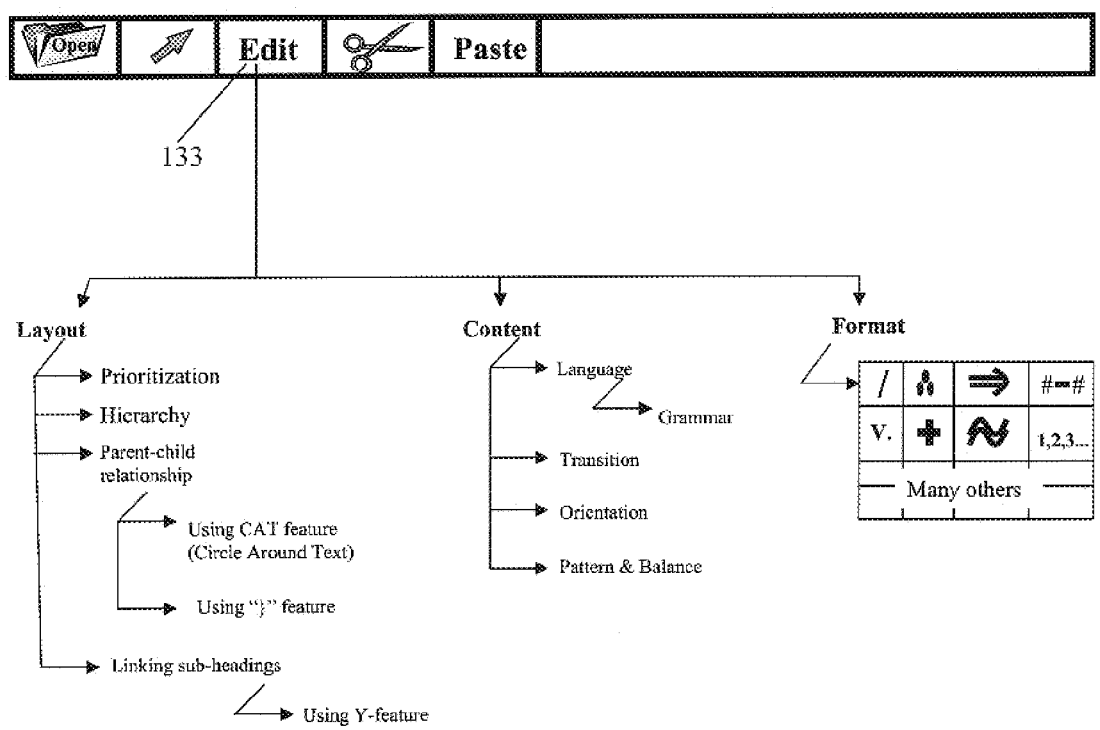
FIG. 11 shows the icons representing the processing steps performed by module 9 used for editing layout, content and/or format.

The structure of the framework may be modified if desired. For example, if the number of sub-headings is five, the author may use the tools 133 to create a smaller number of sub-headings by creating hierarchies as shown in FIG. 10*g*. That is, clicking on one of the tools forming icon 133 initiates an editing module which is described below.
END Of course, the specific icons and arrangements shown in FIGS. 10–10*g* are not important. Further, creating the necessary code to perform each of the steps described above is well within the abilities of a person skilled in the relevant art. Also, although the example uses the structural category example, the same processing would apply to the time, event, procedural and functional categories as well.

Module 9: Editing Layout, Content and/or Format

In the preferred embodiment, after the processing described above has been completed, to provide additional information in the views which were created, or to clean-up or otherwise enhance the output which has been generated, the created files may be edited. Specifically, the layout may be edited, the content may be edited and/or the format may be edited.

To edit the layout, the prioritization, hierarchies within units and/or the structure may be edited. To edit the prioritization, where a number of blocks of information appear in a vertical arrangement such as shown in the first set of information blocks on the left side of FIG. 6*b*, a number (e.g., from 1–4) can be assigned to each block of information which will result in a reordering of the vertical arrangement of the blocks based upon the numbers assigned. Alternatively, a block of information can be selected and then dragged and dropped to a new position. To edit hierarchies within units, again, assuming a vertical arrangement of blocks as in the first set of information blocks on the left side of FIG. 6*b* in which all blocks are within a single hierarchy, first select how many hierarchies are desired (e.g., from 2–7). If for example two hierarchies are desired, then two branches would be created, each with a blank space for a title. All the blocks of information would appear under the first branch. Then select the block or blocks whose hierarchy it is desired to change and cut and paste or drag and drop these selected block or blocks to the second branch. Then type an appropriate title for the two branches. Hierarchies may also be added where the information blocks are horizontally arranged as in FIG. 6*b*, taking all of the information blocks from left to right into account. To edit the structure, existing information blocks are broken up to form a parent child relationship. For example, in FIG. 6*b*, one information block reads as follows:

| The head Ninja was directed by Sergeant Nini who was big, strong, and his neck was the longest |
|---| and a second information block reads as follows:

| He carried a Ninja weapon built in Japan |
|---|

Assume it is desired to form a parent child relationship with the words "Sergeant Nini" being the parent and the words "was big, strong, and his neck was the longest" being one child and the words "He carried a Ninja weapon built in Japan" being a second child. To create this relationship, the words "Sergeant Nini" would first be selected and assigned as the parent, by for example, clicking on a P icon. Then the two children would be selected and assigned as the children by, for example, clicking on a C icon. Then an icon such as 59*a* shown in FIG. 5*a* would be selected to form the parent with two children hierarchy.

To implement the various editing techniques described above or other techniques to change prioritization, hierarchy or structure created by the modules as discussed above would be well within the abilities of a person skilled in the relevant art.

The content, i.e., language, transitions, orientation, patterns and balance may also be edited. The language could be edited using well known word processing techniques. Transitions, orientation, patterns and balance may be edited using techniques used in a variety of graphics oriented programs.

The format, i.e., use of symbols instead of text (e.g., "+" instead of "plus" or 35° instead of thirty-five degrees) can be edited using well known word processing techniques.

Module 10: Knowledge Level Conversion

Currently, problems exist in navigation and information acquisition with respect to learning more details with respect to a set of information.
1. One way this is handled is to select a level based on beginning, intermediate and advanced levels. However, from the end-user's perspective, having to select a level based on beginning, intermediate, advanced levels is not the ideal way of accessing the information. There are several problems with this approach:
   a) when viewing the information as pages on a monitor, there is interruption and the necessity to jump to a completely different page;
   b) this approach does not readily recognize what was new and what the user already covered in previous level.
2. From a development/business perspective:
   The cost of conversion increases because of having to author four versions of the same information and saving them in four different levels.

In general, an end-user does not want to keep changing selections between beginner, intermediate, advanced levels and keep changing back and forth as the user wants more or less detail. It is preferable from a user standpoint to choose a level (e.g., 1–5) and then simply select the layout to view at any of the levels or to select the level of detail of a portion of the layout:

The same author who creates a knowledge level 1 set of information, may perform the following algorithm to create additional levels:
1. recognize the only difference between topics for different knowledge levels is the amount of detail within a unit of information and connecting links. That is, knowledge level conversion should not be treated with distinct separate levels with a clear cut break between groups of users—rather, knowledge level conversion is nothing more than a more detailed explanation/map and their connecting units of information or layouts.
2. recognize each unit of information or layout will be tagged with five levels of detail.
3. recognize each topic accessed by the user will display a unit of information or layout based on the level of detail chosen
4. recognize each new unit of information or layout that the user requests will have its own accessing the information and at any layout can view the information in any of the five knowledge levels of difficulties.

As an example, assume that a unit of information is assigned level 3. A more detailed view of that unit will begin with a new numbering of each information unit within the more detailed view from level 1 to level 5. It should be noted that knowledge conversion may be performed regardless of whether the original document is all text, all images or a combination of text and images.

Figure 12:
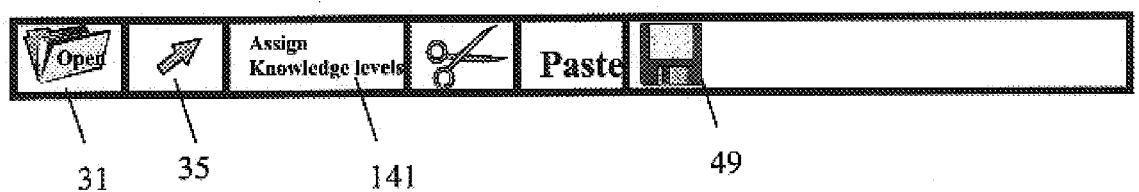
FIG. 12 shows the icons representing the processing steps performed by module 10.
Figure 12A:
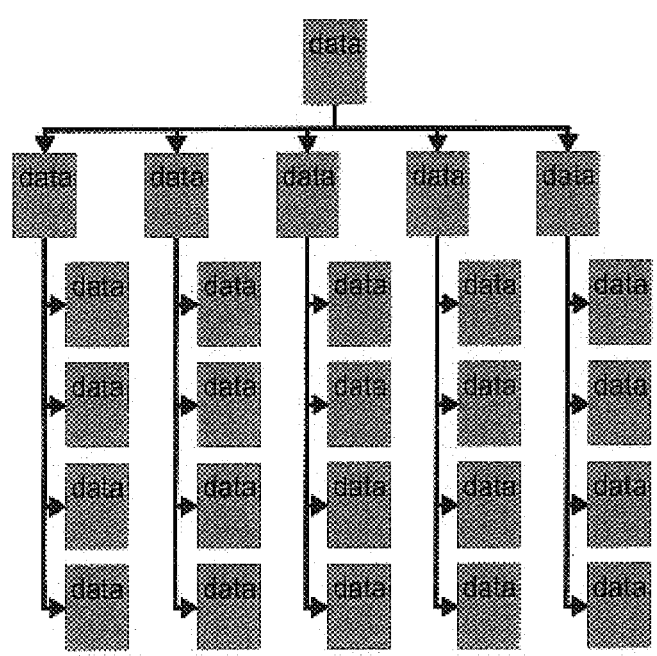
FIGS. 12a–12e show the results of the various processing steps performed by module 10.
Figure 12B:
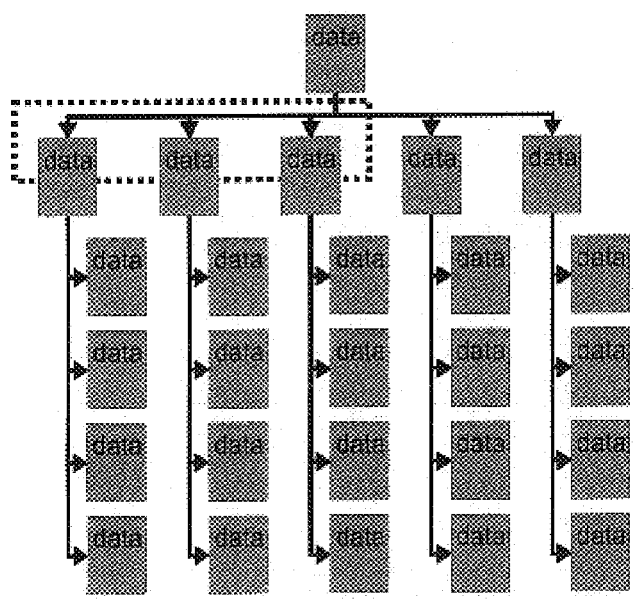
Figure 12C:
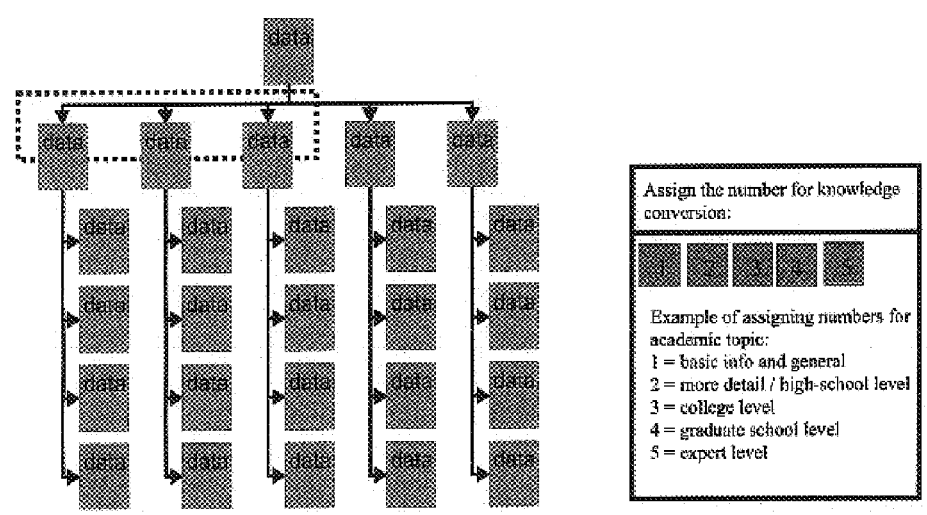
Figure 12D:
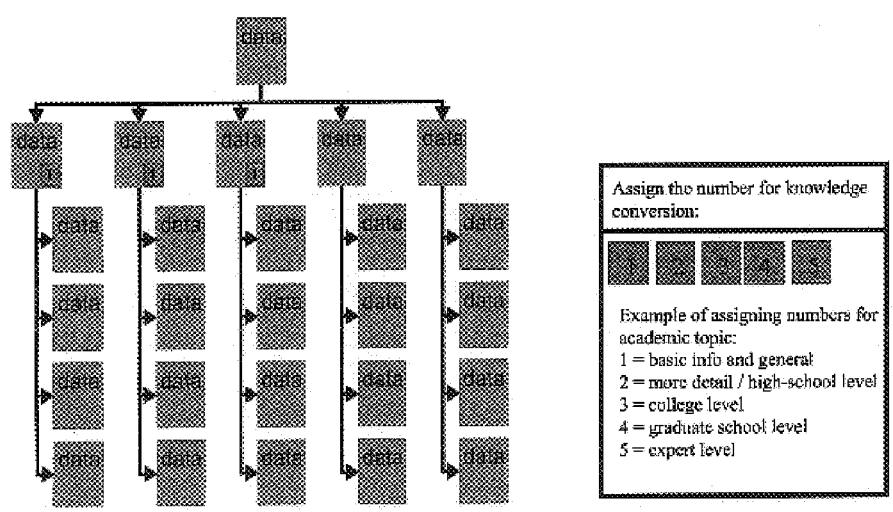
Figure 12E:
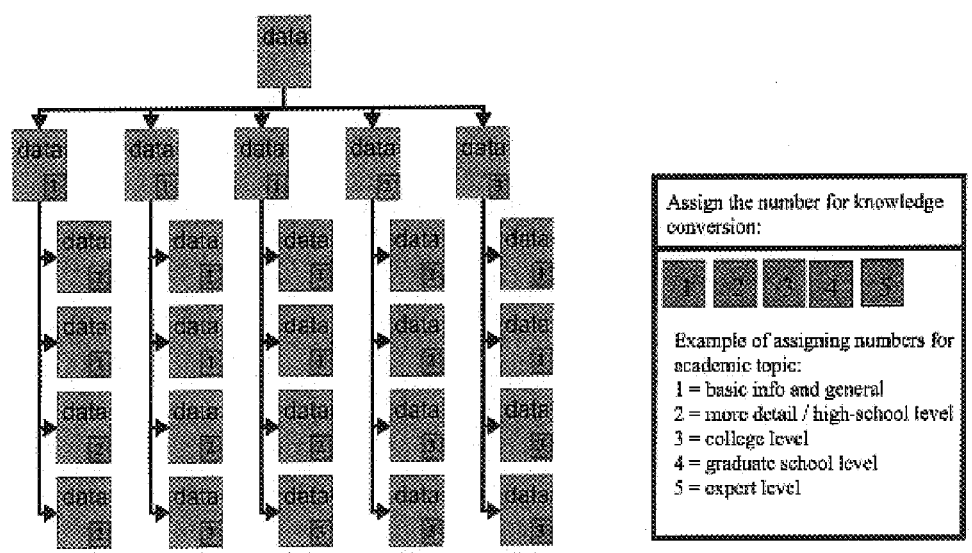

Once processing by modules 1–6 has been completed, module 10 may be used to perform knowledge level conversion as outlined above as described below with reference to FIGS. 12–12e.
BEGIN
1) Click on icon 31 to open the unit for which it is desired to perform knowledge level conversion. The result is shown in FIG. 12a.
2) Click on icon 34 and use the pointer to select the nodes and arrow head portions for which it is desired to assign a knowledge level. The result is shown in FIG. 12b.
3) Click on icon 141 to produce a window with numbers corresponding to levels to be used for knowledge conversion as shown in FIG. 12c.
4) Select a number according to a desired level of knowledge to be assigned. The result shown is shown in FIG. 12s assuming level 1 was selected.
5) Repeat assigning numbers as in step 4 for each heading and child to produce the results shown in FIG. 12e.
6) Click on icon 49 to save the document.

Once this conversion has been performed, a user can be presented with more or less detailed information depending selected level. This may be implemented in a view mode by the user selecting a heading for which it is desired to see more detail and then choosing the level of detail desired. Of course, the chosen level of detail can be changed by the user as desired.
END Of course, the specific icons and arrangements shown in FIGS. 12–12e are not important. Further, creating the necessary code to perform each of the steps described above is well within the abilities of a person skilled in the relevant art.

Further processing, which is optional, may then be performed to add multimedia components.

While there has been described and illustrated specific embodiments of the invention, it will be clear that variations in the details specifically illustrated and described may be made without departing from the true spirit and scope of the invention as defined in the appended claims when interpreted in accordance with the full breadth to which the claims are legally and equitably entitled.

I claim:

1. A method for converting a document which contains a plurality of text and pictures which is intended to convey information in a traditional, linear format into a new structural document for display in which the text and pictures are rearranged so that the information is laid out in a pictorial representation, said method using a computer having a monitor or other display device and comprising:
   accessing a previously created document such that it is displayed on a monitor or other display device;
   selecting picture portions of the document and assigning one of a set of categories to each selected portion for subsequent processing, wherein the assigned category is based on the subject matter of the picture content of the document and said selecting initiated by selecting a predetermined icon on said monitor or other display device;
   selectively linking said selected picture portions with rearranged text;
   processing the selected picture portions of the document based upon the assigned category so as to arrange the selected picture portions and rearranged text so they appear on the monitor or other display device in another pictorial arrangement, said processing initiated by selecting a predetermined icon on said monitor or other display device; and
   creating or obtaining a picture external to the document and assigning one of said categories from said set to said external picture for subsequent processing, wherein said pictorial arrangement is an exploded view.

2. The method defined by claim 1 wherein the categories are one of: i) structural, ii) functional, iii) procedural, iv) time based, and v) event based.

3. The method defined by claim 1 further comprising: editing at least one of layout, content and format of said pictorial arrangement.

4. An article of manufacture comprising:
   a computer usable medium having computer readable program code means embodied therein for converting a document which contains a plurality of text and pictures which is intended to convey information in a traditional, linear format into a new structural document for display in which the text and pictures are rearranged so that the information is laid out in a pictorial representation, the computer readable program code means in said article of manufacture comprising:

computer readable program code means for accessing a previously created document such that it is displayed on a monitor or other display device;

computer readable program code means for selecting picture portions of the document and assigning one of a set of categories to each selected picture portion for subsequent processing, wherein the assigned category is based on the subject matter of the picture content of the document and said means for selecting initiated by selecting a predetermined icon on said monitor or other display device;

computer readable program code means for selectively linking said selected picture portions with rearranged text;

computer readable program code means for processing the selected picture portions of the document based upon the assigned category so as to arrange the selected picture portions and rearranged text so they appear on the monitor or other display device in a pictorial arrangement, said processing initiated by selecting another predeternmined icon on said monitor or other display device;

computer readable program code means for creating or obtaining a picture external to the document and assigning one of said categories from said set to said external picture for subsequent processing, wherein said pictorial arrangement is an exploded view.

5. The method defined by claim 1 further comprising: selecting portions of the displayed pictorial arrangement and assigning a knowledge level to each of the selected portions.

\* \* \* \* \*